(12) United States Patent
Kitahata et al.

(10) Patent No.: US 6,169,677 B1
(45) Date of Patent: Jan. 2, 2001

(54) POWER CONVERTING SYSTEM MULTIPLEXED WITH VOLTAGE DIVIDING TRANSFORMERS, THE VOLTAGE TRANSFORMERS, AND CONTROLLER FOR THE SYSTEM

(75) Inventors: Takeshi Kitahata, Kanagawa; Hiroyuki Nishikawa, Tokyo; Hiroshi Uchino, Tokyo; Takashi Fujita, Tokyo; Takahisa Kageyama, Chiba-ken; Takeo Kanai; Akira Kawaguchi, both of Saitama-ken; Tadahiro Sakamoto, Tokyo, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/413,872

(22) Filed: Oct. 7, 1999

(30) Foreign Application Priority Data

Oct. 15, 1998 (JP) .................................................. 10-292683
Nov. 10, 1998 (JP) .................................................. 10-318250

(51) Int. Cl.[7] .............................. H02M 7/00; H02M 7/44; H02M 7/5387

(52) U.S. Cl. .............................. 363/71; 363/98; 363/132
(58) Field of Search .................................. 363/71, 56, 65, 363/69, 98, 132, 137, 136

(56) References Cited

U.S. PATENT DOCUMENTS 5,416,458 * 5/1995 Menke et al. ............................ 336/12
5,555,494 * 9/1996 Morris ...................................... 363/17

FOREIGN PATENT DOCUMENTS 10-323052   12/1998   (JP) .................................. H02M 7/48

* cited by examiner

Primary Examiner—Peter S. Wong
Assistant Examiner—Bao Q. Vu
(74) Attorney, Agent, or Firm—Foley & Lardner

(57) ABSTRACT

A power converting system has power converters for converting a direct current into an alternating current, a DC power source arranged on the DC side of the power converters, and voltage dividing transformers having windings whose first ends are connected to the power converters phase by phase and whose second ends are joined together and connected to a load phase by phase. Also provided is a controller for controlling the power converting system.

12 Claims, 21 Drawing Sheets

POWER CONVERTING SYSTEM MULTIPLEXED WITH VOLTAGE DIVIDING TRANSFORMERS, THE VOLTAGE TRANSFORMERS, AND CONTROLLER FOR THE SYSTEM

BACKGROUND OF THE INVENTION

1. Field of the Invention

The present invention relates to a power converting system multiplexed with voltage dividing transformers, the voltage transformers themselves, and a controller for controlling the power converting system so that the system may output sine waves having reduced harmonics.

2. Description of the Prior Art

An inverter for driving a motor at variable speeds generates AC voltages including direct currents. To smoothly drive the motor at variable speeds, the voltages generated by the inverter must be of sine waves involving reduced harmonics.

To meet the requirements for outputting sine waves with reduced harmonics, NPC inverters (3-level inverters) are frequently employed for power converting systems.

FIG. 1 shows a main circuit of an NPC inverter according to a prior art. The NPC inverter is capable of providing three phase-voltages and five line-voltages, to greatly reduce harmonics. The NPC inverter is characterized in that a voltage applied to each switching element is theoretically half that of a conventional inverter, and therefore, is easy to increase the capacity and voltage thereof.

The NPC inverter of FIG. 1, however, employs capacitors C1 and C2 to divide a DC voltage to increase the number of output levels, and therefore, has limits to the constant voltage characteristics thereof. Namely, a neutral point NT of a DC power source is connected to a load through diodes and switching elements for a certain period during which a current flows to the neutral point NT. Then, in spite of a constant DC voltage, the potential of the neutral point NT varies at a frequency that is three times as large as an output frequency. If a DC component in an output voltage involves a bias, divided voltage levels will greatly be biased to apply large voltages to the switching elements.

Variations at the neutral point NT may be suppressed by controlling an output voltage of the inverter. To achieve this, a DC link voltage must be set higher than an output line voltage required by the load connected to the inverter. This limits a modulation factor of the NPC inverter. A peak output line voltage of the inverter is "($\sqrt{3}/2$)×M×Vdc," where M is a modulation factor and Vdc is a DC voltage. If the NPC inverter has a limit modulation factor of about 0.8, a limit peak output line voltage will be about 0.69 times of the DC voltage. In other words, a required peak output line voltage is obtainable only from a DC voltage that is about 1.45 times as large as the peak voltage. To supply such a high DC voltage, many switching elements must be connected in series, thereby increasing the number of the switching elements and the cost of the power converting system.

PWM control for the NPC inverter carries out comparison with the use of a triangle wave having a fixed carrier frequency. This PWM control is low in voltage use ratio and involves unnecessary switching operations to be repeated in synchronization with the carrier frequency, thereby increasing a switching loss, decreasing the efficiency of the power converting system, enlarging a stack and cooling system, and heightening the total cost of the system.

If there is a load that requires accurate sine-wave voltages, inverters must be connected and operated in parallel and PWM control signals of the inverters must be multiplexed to reduce harmonics.

FIG. 2 shows a power converting system multiplexed with N sets of 3-phase bridge inverters connected in parallel with one another. The N inverters form an inverter group 100 to convert a direct current into an alternating current. U-phases of the inverters are connected to an AC reactor group 200U, V-phases thereof to an AC reactor group 200V, and W-phases thereof to an AC reactor group 200W. The output of the reactor group 200U is connected to a U-phase of a load 300, the output of the reactor group 200V to a V-phase of the load 300, and the output of the reactor group 200W to a W-phase of the load 300. The inverters are PWM-controlled, PWM control signals for the inverters are multiplexed, and AC voltages from the inverters are synthesized through the reactor groups 200U, 200V, and 200W into sine waves, which are supplied to the load 300.

FIG. 3 shows the structure of one inverter in the inverter group 100. The inverter consists of switching elements Q1 to Q6 and diodes D1 to D6 that are connected to the switching elements Q1 to Q6, respectively, in a reversed parallel configuration.

FIG. 4 shows a structure of the AC reactor group 200U connected to the U-phases of the inverter group 100. Each reactor consists of an iron core 204 and a winding 205 wound around the iron core 204. On the load side, the reactors are joined together. The reactors are magnetically independent of one another.

A current IU flowing to the load 300 is divided by N, and a current of 1/N of IU passes through each reactor and each inverter. The inductance of each reactor is designed to be sufficiently small so that it does not act as impedance on the frequency of a fundamental wave supplied to the load 300. Namely, the inductance of each reactor is sufficiently small with respect to the inductance of the load 300, and a voltage drop at each reactor due to the current flowing to the load 300 is sufficiently small.

The operation of the AC reactors will be explained. In FIG. 4, the AC reactor group 200U passes load current components I1U to INU and cross-current components I1UC to INUC.

The cross-current components are not directly related to the load 300. However, they are synthesized with the load current components and flow through the reactors and inverters. If the cross-current components are large, the current capacity of each switching element such as a GTO of each inverter must be high. Namely, the inverters must have current capacity that is greater than that matching the load 300. This makes the power converting system uneconomic.

To suppress the cross currents, each reactor may be designed to produce large inductance. This, however, increases the size, weight, and cost of each reactor. This also increases an installation space of the power converting system, and the strength of the floor on which the system is installed must be reinforced, thereby increasing the total cost of the system.

FIG. 5 is a power converting system according to a prior art having N current-type inverters that are connected and operated in parallel to supply sine-wave currents to a load. The N inverters form an inverter group 600. On the AC side of the inverter group 600, U-, V-, and W-phases of the inverters are connected to U-, V-, and W-phases of the load 300, respectively, through a smoothing capacitor 700. DC terminals of the inverter group 600 are connected to a DC power source 900 through cross-current suppressing reactor groups 800P and 800N.

The DC power source 900 supplies a constant direct current ID. Since an average of DC terminal voltages E1D-P to END-P is equal to an average of DC terminal voltages E1D-N to END-N, each reactor of the reactor groups 800P and 800N passes a direct current of 1/N of ID. The reactor groups 800P and 800N generate substantially no impedance with respect to the direct current ID.

The current-type inverters are PWM-controlled and multiplexed. The DC terminal voltages E1D-P to END-P and E1D-N to END-N have an identical DC component and different momentary voltages. Due to the difference among the momentary voltages, cross currents flow to the DC terminals of the inverters.

The reactor groups 800P and 800N serve to suppress the cross currents and have the same structures as those of FIG. 4. Namely, these reactor groups are large and heavy and increase the cost of the power converting system. In addition, they increase the installation space of the system, and the strength of the floor on which the system is installed must be reinforced, thereby further increasing the cost of the system.

SUMMARY OF THE INVENTION

A first object of the present invention is to provide an economic power converting system employing voltage dividing transformers in place of AC reactors. The voltage dividing transformers have each a multi-leg iron core and are arranged in parallel with one another.

A second object of the present invention is to provide a PWM-control power converting system capable of minimizing the number of switching operations to reduce a switching loss.

In order to accomplish the objects, a first aspect of the present invention provides a power converting system having a power converter group consisting of power converters for converting a direct current into an alternating current involving a plurality of phases, a DC power source arranged on the DC side of the power converter group, and voltage dividing transformers each having windings connected to AC terminals of an identical phase of the power converters, the other ends of the windings of each voltage dividing transformer being joined together. The voltage dividing transformers are connected to phases of a load, respectively.

The power converting system of the first aspect employs, instead of conventional AC reactors, the voltage dividing transformers to parallel-multiplex the outputs of the power converters. Each of the transformers has a multi-leg iron core around which windings are wound to receive power of an identical phase from the power converters. Magnetomotive force produced by a load current in each winding is canceled among the windings of each iron core so that the load current produces no magnetic flux in the iron core, thereby causing no acting impedance. In connection with cross currents, magnetomotive force acts in the direction to generate magnetic flux in the iron core and provide impedance that suppresses the cross currents.

A second aspect of the present invention provides a power converting system having a power converter group consisting of power converters for converting a direct current into an alternating current, a first voltage dividing transformer having windings whose first ends are joined together and whose second ends are connected to first DC terminals of the power converters, respectively, a second voltage dividing transformer having windings whose first ends are joined together and whose second ends are connected to second DC terminals of the power converters, respectively, and a DC power source connected to the first and second voltage dividing transformers for supplying DC power to the DC side of the power converters through the first and second voltage dividing transformers. AC terminals of the power converters are connected together phase by phase and are connected to a load phase by phase.

The power converting system of the second aspect employs, instead of conventional cross-current suppressing AC reactors, the multi-leg voltage dividing transformers to supply power to the power converters. Magnetomotive force produced in each winding of the transformers due to a current from the DC power source is canceled among the windings so that no magnetic flux is generated in each iron core to provide no impedance. Magnetomotive force due to cross currents is generated in a direction to produce magnetic flux in each iron core and provide impedance to suppress the cross currents.

The voltage dividing transformers of the first or second aspect consist each of a multi-leg iron core and a winding wound around each leg of the iron core. The number of legs of the iron core corresponds to the number of the power converters of the power converter group. The windings of one transformer receives power of an identical phase.

A third aspect of the present invention provides a controller for a power converting system having a power converter provided with switching elements connected in a bridge configuration. The controller has a vector generator, a vector selector, and a gate pattern circuit. The vector generator generates a voltage command vector for the power converter according to a current command and a detected load current. The vector selector defines an origin at start points of all possible voltage vectors to be provided by the power converter, sets a plane containing the origin and end points of the possible voltage vectors, finds, on the plane, an error vector between the voltage command vector and an actual voltage vector, temporally integrates absolute values of such error vectors into an integrated value, and if the integrated value exceeds a threshold, extends differential vectors from an end point of the error vector toward the possible voltage vectors that are in the vicinity of the voltage command vector, finds one of the differential vectors that forms a minimum angle with respect to the error vector, and selects one of the possible voltage vectors that is specified by the minimum-angle differential vector as an actual output voltage vector. According to the actual output voltage vector, the gate pattern circuit provides ON/OFF commands to the switching elements of the power converter.

The controller of the third aspect generates a voltage command vector for the power converter according to a current command and a detected load current, defines an origin at start points of all possible voltage vectors to be provided by the power converter, sets a plane containing the origin and end points of the possible voltage vectors, finds, on the plane, an error vector between the voltage command vector and an actual voltage vector, temporally integrates absolute values of such error vectors into an integrated value, and if the integrated value exceeds a threshold, extends differential vectors from an end point of the error vector toward the possible voltage vectors that are in the vicinity of the voltage command vector, finds one of the differential vectors that forms a minimum angle with respect to the error vector, selects one of the possible voltage vectors that is specified by the minimum-angle differential vector as an actual output voltage vector, and according to the actual output voltage vector, turns on and off the switching elements of the power converter.

A fourth aspect of the present invention provides a controller for a power converting system having a power converter group consisting of power converters for converting a direct current into an alternating current involving a plurality of phases, a DC power source arranged on the DC side of the power converter group, and voltage dividing transformers each having windings connected to AC terminals of an identical phase of the power converters, the other ends of the windings of each voltage dividing transformer being joined together and connected to phases of a load, respectively, a vector generator, a vector selector, and a gate pattern circuit.

The vector generator generates a voltage command vector for the power converters according to a current command and a detected load current. The vector selector defines an origin at start points of all possible voltage vectors to be provided by the power converters, sets a plane containing the origin and end points of the possible voltage vectors, finds, on the plane, an error vector between the voltage command vector and an actual voltage vector, temporally integrates absolute values of such error vectors into an integrated value, and if the integrated value exceeds a threshold, extends differential vectors from an end point of the error vector toward the possible voltage vectors that are in the vicinity of the voltage command vector, finds one of the differential vectors that forms a minimum angle with respect to the error vector, and selects one of the possible voltage vectors that is specified by the minimum-angle differential vector as an actual output voltage vector. According to the actual output voltage vector, the gate pattern circuit provides ON/OFF commands to the switching elements of the power converters.

The controller of the fourth aspect generates a voltage command vector for the power converters according to a current command and a detected load current, defines an origin at start points of all possible voltage vectors to be provided by the power converters, sets a plane containing the origin and end points of the possible voltage vectors, finds, on the plane, an error vector between the voltage command vector and an actual voltage vector, temporally integrates absolute values of such error vectors into an integrated value, and if the integrated value exceeds a threshold, extends differential vectors from an end point of the error vector toward the possible voltage vectors that are in the vicinity of the voltage command vector, finds one of the differential vectors that forms a minimum angle with respect to the error vector, selects one of the possible voltage vectors that is specified by the minimum-angle differential vector as an actual output voltage vector, and according to the actual output voltage vector, turns on and off the switching elements of the power converters.

The controller may further have a flux detector for detecting magnetic flux generated by the voltage dividing transformers and a saturation suppressor for checking to see if the detected magnetic flux is above a predetermined value according to the outputs of the vector selector and flux detector, and if it is above the predetermined value, controlling the outputs of the power converters to reduce magnetic flux generated by the voltage dividing transformers.

This arrangement detects magnetic flux generated by the voltage dividing transformers, and if the detected magnetic flux is above a predetermined value, adjusts the outputs of the power converters to reduce magnetic flux generated by the voltage dividing transformers.

The controller may further have an exciting current detector for detecting an exciting current for the voltage dividing transformers, a flux estimating circuit for estimating magnetic flux generated by the voltage dividing transformers according to the detected exciting current, and a saturation suppressor for checking to see if the estimated magnetic flux is above a predetermined value according to the outputs of the vector selector and flux estimating circuit, and if it is above the predetermined value, controlling the outputs of the power converters to reduce magnetic flux generated by the voltage dividing transformers.

This arrangement detects an exciting current for the voltage dividing transformers and estimates magnetic flux generated by the voltage dividing transformers according to a detected exciting current. If the estimated magnetic flux is above a predetermined value, this arrangement adjusts the outputs of the power converters to reduce magnetic flux generated by the voltage dividing transformers.

The controller may further have a voltage detector for detecting a voltage applied to each winding of the voltage dividing transformers, a flux estimating circuit for estimating magnetic flux generated by the voltage dividing transformers according to the detected voltage, and a saturation suppressor for checking to see if the estimated magnetic flux is above a predetermined value according to the outputs of the vector selector and flux estimating circuit, and if it is above the predetermined value, controlling the outputs of the power converters to reduce magnetic flux generated by the voltage dividing transformers.

This arrangement estimates magnetic flux of the voltage dividing transformers according to a voltage applied to each winding of the voltage dividing transformers. If the estimated magnetic flux is above a predetermined value, this arrangement adjusts the outputs of the power converters to reduce magnetic flux generated by the voltage dividing transformers.

The controller may further have a flux estimating circuit for estimating magnetic flux generated by the voltage dividing transformers according to a switching state of the power converters and a saturation suppressor for checking to see if the estimated magnetic flux is above a predetermined value according to the outputs of the vector selector and flux estimating circuit, and if it is above the predetermined value, controlling the outputs of the power converters to reduce magnetic flux generated by the voltage dividing transformers.

This arrangement estimates magnetic flux generated by the voltage dividing transformers according to a switching state of the power converters. If the estimated magnetic flux is above a predetermined value, this arrangement adjusts the outputs of the power converters to reduce magnetic flux generated by the voltage dividing transformers.

The controller may have a corrector for correcting an error between the estimated magnetic flux and actual magnetic flux according to the magnetic flux, exciting current, or winding voltage of the voltage dividing transformers.

This arrangement corrects an error between estimated magnetic flux and actual magnetic flux according to the magnetic flux, exciting current, or winding voltage of the voltage dividing transformers.

DETAILED DESCRIPTION OF THE EMBODIMENTS

Figure 1:
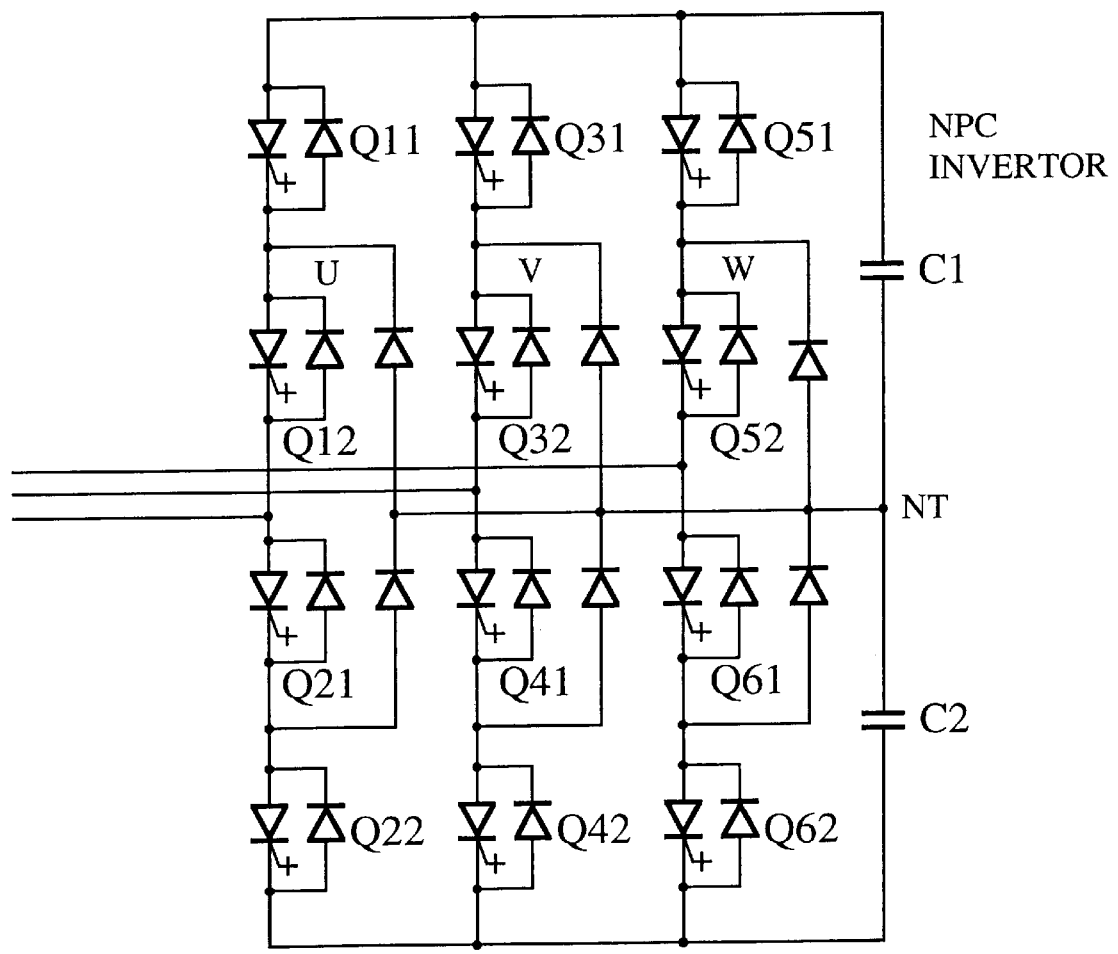
FIG. 1 is a block diagram showing a main circuit of an NPC inverter according to a prior art.
Figure 2:
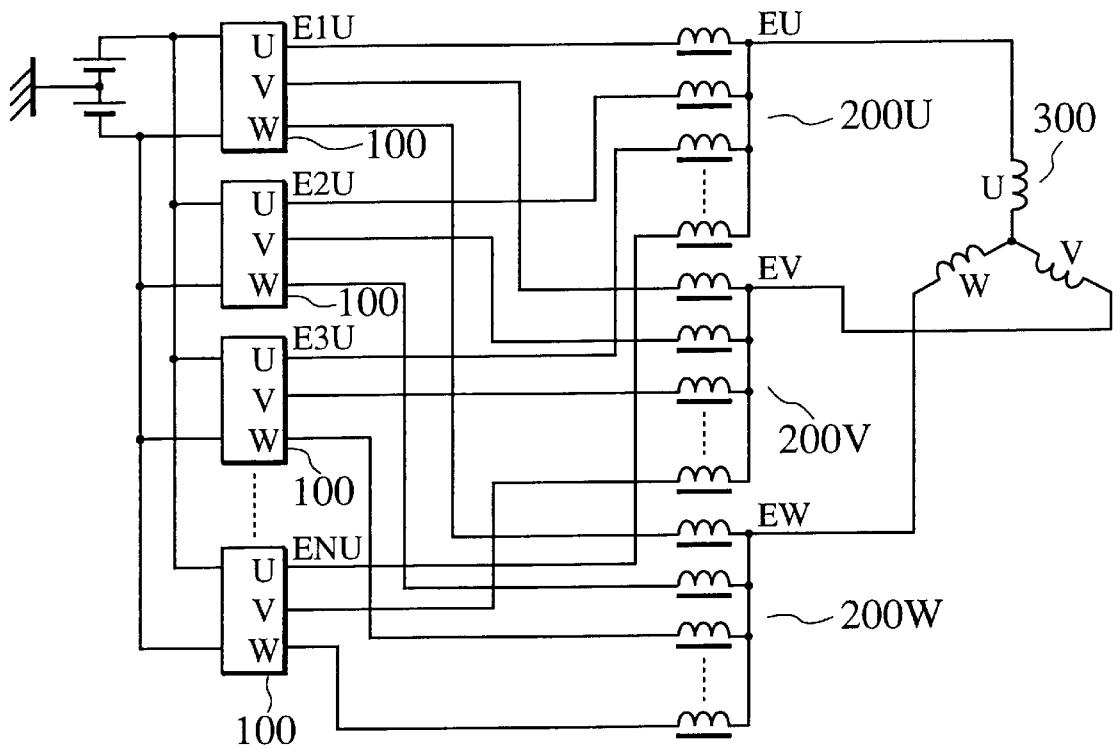
FIG. 2 is a block diagram showing a power converting system having voltage-type inverters that are parallel-multiplexed according to a prior art.
Figure 3:
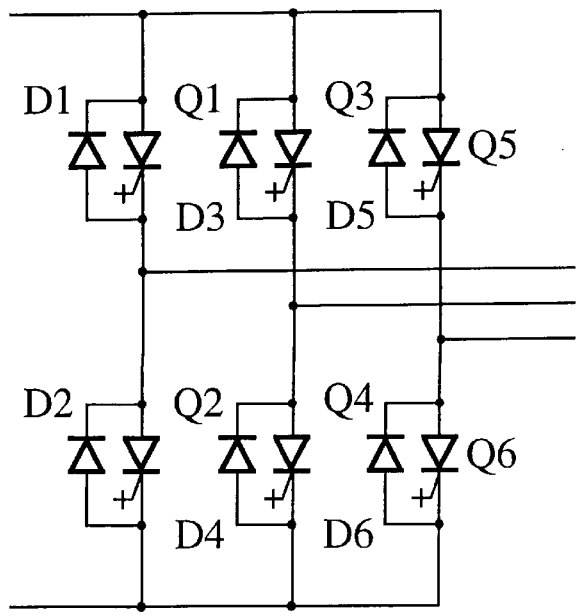
FIG. 3 is a block diagram showing a 3-phase bridge inverter according to a prior art.
Figure 4:
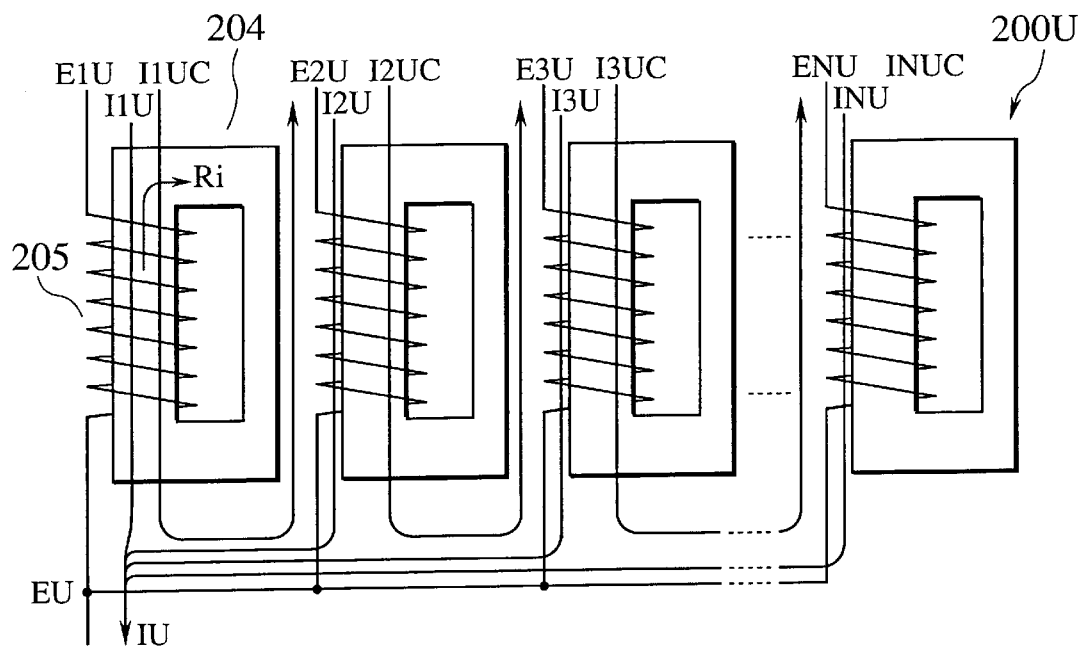
FIG. 4 is a block diagram showing parallel AC reactors of the system of FIG. 2.
Figure 6:
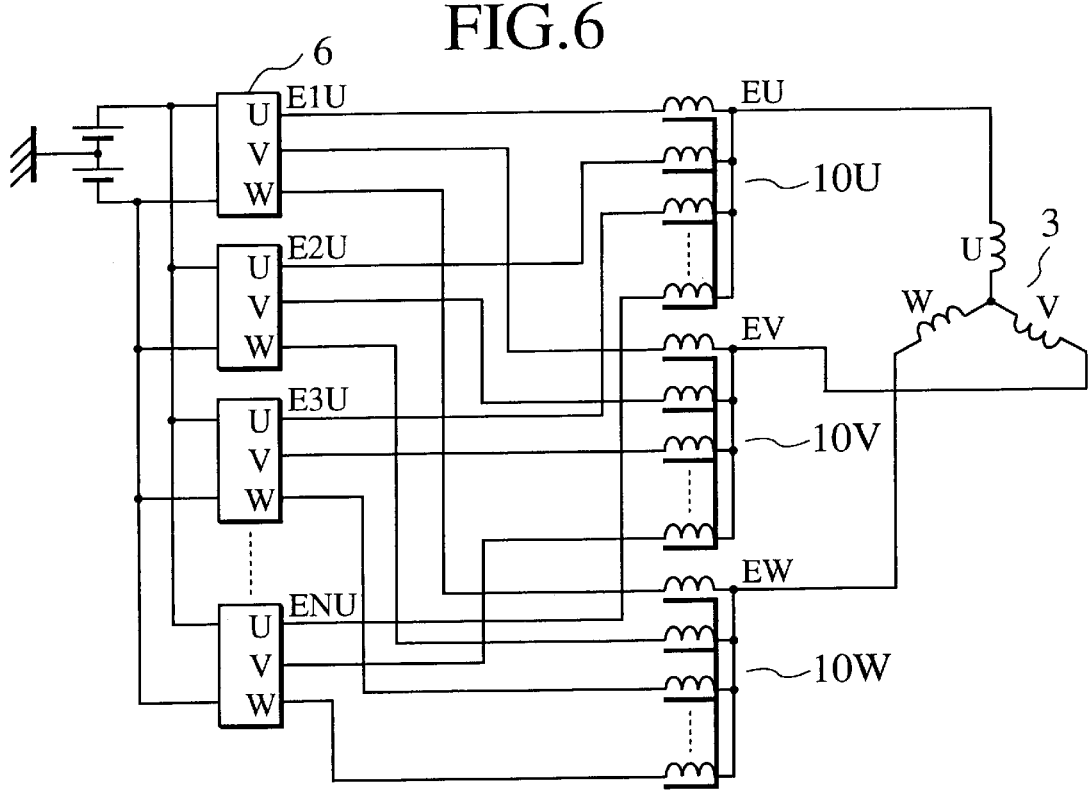
FIG. 6 is a block diagram showing a power converting system according to a first embodiment of the present invention.

FIG. 6 shows a power converting system according to the first embodiment of the present invention. Unlike the prior art of FIG. 2 that employs AC reactors to multiplex the outputs of parallel inverters, the first embodiment employs voltage dividing transformers each having a multi-leg iron core to multiplex parallel inverters. Except the difference that the first embodiment employs voltage dividing transformers instead of AC reactors, the operation and driving method of the first embodiment are basically the same as those of the prior art, and therefore, the same explanation will not be made again.

In FIG. 6, U-phase AC terminals of first to Nth inverters are connected to windings of a first voltage dividing transformer 10U, respectively. V-phase AC terminals of the inverters are connected to windings of a second voltage dividing transformer 10V, respectively. W-phase AC terminals of the inverters are connected to windings of a third voltage dividing transformer 10W, respectively. The other ends of the windings of the transformer 10U are joined together and connected to a U-phase of a load. The other ends of the windings of the transformer 10V are joined together and connected to a V-phase of the load. The other ends of the windings of the transformer 10W are joined together and connected to a W-phase of the load.

The load is, for example, a variable-speed motor, which can smoothly operate from a stopped state to a required speed with the power converting system of FIG. 6 without torque fluctuations.

Figure 7:
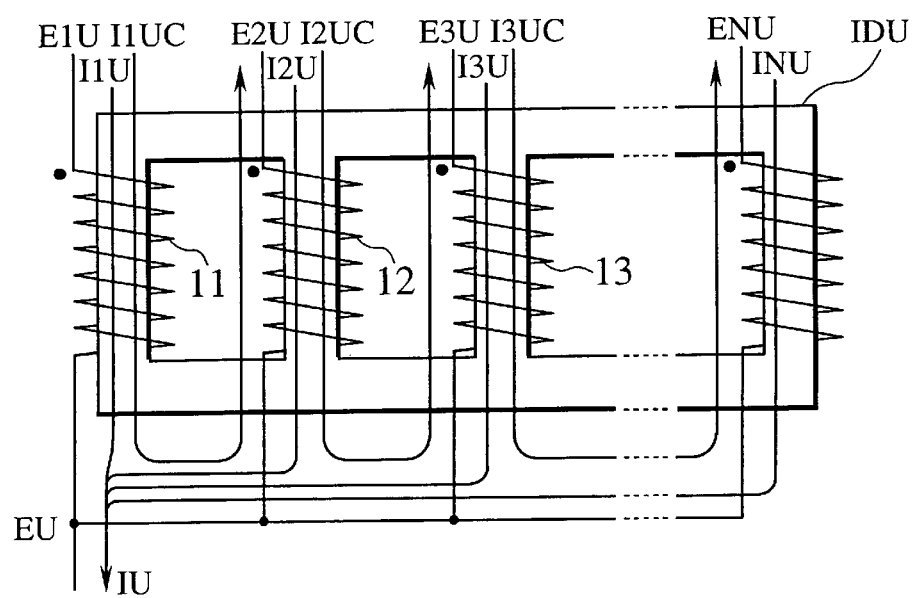
FIG. 7 is a block diagram showing a voltage dividing transformer applicable to the system of FIG. 6.

FIG. 7 shows the structure of the voltage dividing transformer 10U of the first embodiment. The transformers 10V and 10W have each the same structure as the transformer 10U. The transformer 10U has a multi-leg iron core. Legs of the iron core have windings whose numbers of winds are equal to one another in terms of the polarity of a winding direction represented with a dot mark. The structure of the transformer 10U is basically the same as that of a standard transformer. In this embodiment, the transformer 10U has four legs to receive the U-phases of the inverters, respectively.

In FIG. 7, the legs of the iron core are arranged along a straight line. This structure is inexpensive. In actual manufacturing, the impedance values of the windings slightly differ from one another due to structural restrictions. Such differences, however, cause no problem in the power converting system of the present invention.

Figure 8:
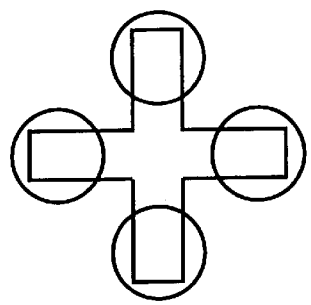
FIG. 8 is a plan view showing a multi-leg iron core of a voltage dividing transformer applicable to the system of FIG. 6.
Figure 9:
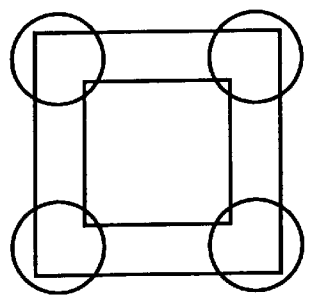
FIG. 9 is a plan view showing another multi-leg iron core of a voltage dividing transformer applicable to the system of FIG. 6.

FIGS. 8 and 9 show other structures applicable to the voltage dividing transformers of the power converting system of the present invention. To solve the impedance problem of the structure of FIG. 7 and maximize equality of winding impedance values, FIGS. 8 and 9 circularly arrange iron-core legs around which windings are wound. Since the structures of FIGS. 8 and 9 are special, they are more or less expensive than the structure of FIG. 7. The structures of FIGS. 8 and 9 equidistantly arrange windings to ideally equalize impedance values among the windings.

The operation of the power converting system of the first embodiment will be explained. Basic matters about inverters already explained will not be repeated. The operation of the voltage dividing transformers explained below is different from that of the prior art.

The voltage dividing transformer of FIG. 7 involves air magnetic resistance Rg that is outside the iron core and inner magnetic resistance Ri that is inside the iron core. The air magnetic resistance Rg is 20 to 30 thousand times as large as the inner magnetic resistance Ri. When a current passes through a winding, it produces magnetomotive force. Dividing the magnetomotive force by magnetic resistance provides magnetic flux. This is a basic matter of electrical engineering, and therefore, will not be explained in more detail.

The operation of the voltage dividing transformer with respect to a load current will be explained. The load current IU is equally divided by N into load current components I1U to INU, which pass through the windings of the transformer as explained with reference to the prior art. Since the windings of the transformer pass the same load current, electromotive force produced by each winding has the same magnitude, and the directions of the electromotive forces in the adjacent windings are opposite to each other. Accordingly, the electromotive forces in the adjacent windings cancel each other to produce no flux in the iron core due to the load current. As a result, the voltage dividing transformer causes no voltage drop in the windings due to the load current. Namely, the voltage dividing transformer provides no inductance with respect to the load current.

In an actual voltage dividing transformer, however, magnetomotive force due to load current components slightly forms a magnetic circuit around an iron core to produce magnetic flux outside the iron core. Since the air magnetic resistance Rg is several tens of thousands greater than the inner magnetic resistance Ri, magnetic flux (leakage magnetic flux) outside the iron core due to the load current is very small. Accordingly, a voltage drop (leakage inductance) in each winding due to the leakage flux is ignorable.

The operation of the voltage dividing transformer with respect to a cross current will be explained. Momentary values of voltages e1u to ENU differ from one another, thereby passing cross currents I1UC to I(N−1)UC through the windings of the transformer. In FIG. 7, the cross current I1UC flows from the winding 11 to the winding 12, and the cross current I2UC from the winding 12 to the winding 13. When the cross current I1UC flows, magnetomotive force in the winding 11 produces magnetic flux in the iron core. Namely, the windings of the voltage dividing transformer generate impedance to suppress the cross currents.

Figure 10:
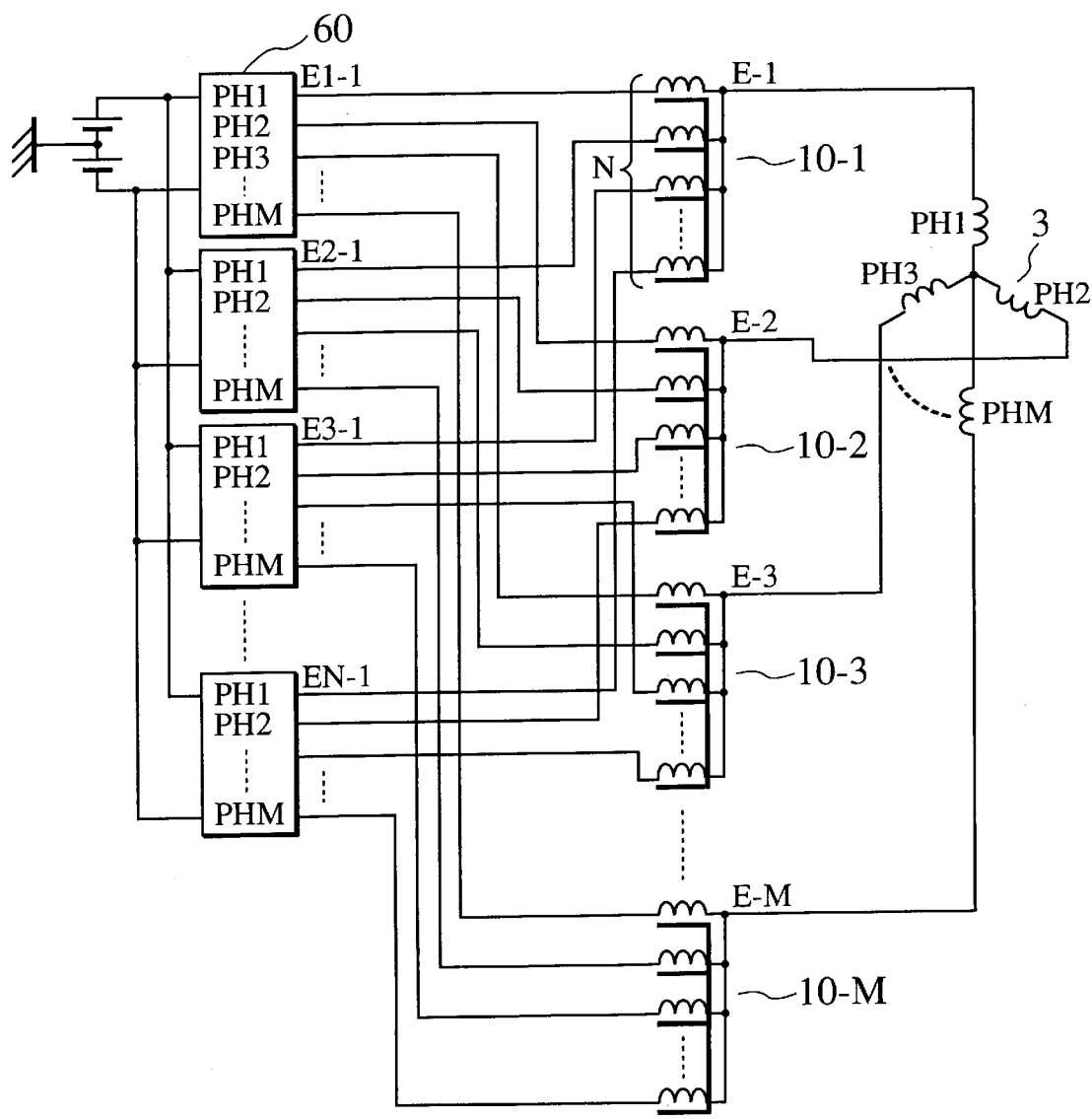
FIG. 10 is a block diagram showing a power converting system according to a second embodiment of the present invention.

Although the inverters of the embodiment are 3-phase bridge inverters, the present invention may also employ single-phase-configuration 3-phase bridge inverters, NPC inverters capable of providing output voltages of multiple levels, etc. Although each inverter of the embodiment is of three phases, the present invention is applicable to M-phase inverters as shown in FIG. 10 as the second embodiment, where M is an optional number. In FIG. 10, each one of N (N is an optional number.) inverters is M-phase inverter, and each of M dividing voltage transformers 10-1 to 10-M has an N-leg iron core. A wiring is wound around each of N legs of the iron core. A load 3 is an M-phase load and supplied power from N inverters. of M-phase via M dividing voltage transformers 10-1 to 10-M each having N-legs.

As explained above, the power converting system of the first or second embodiment is parallel-multiplexed with voltage dividing transformers to produce no impedance with respect to a load current. As a result, load voltage components provided by the parallel inverters are applied as they are to a load, thereby improving the voltage use ratio of the inverters.

The voltage dividing transformers of the first embodiment effectively work to suppress cross currents, thereby improving the current use ratio of the inverters. Unlike the prior art that employs many separate AC reactors to increase the size, weight, and cost of a power converting system, the first embodiment effectively uses voltage dividing transformers to reduce the size, weight, and cost of the power converting system.

Figure 5:
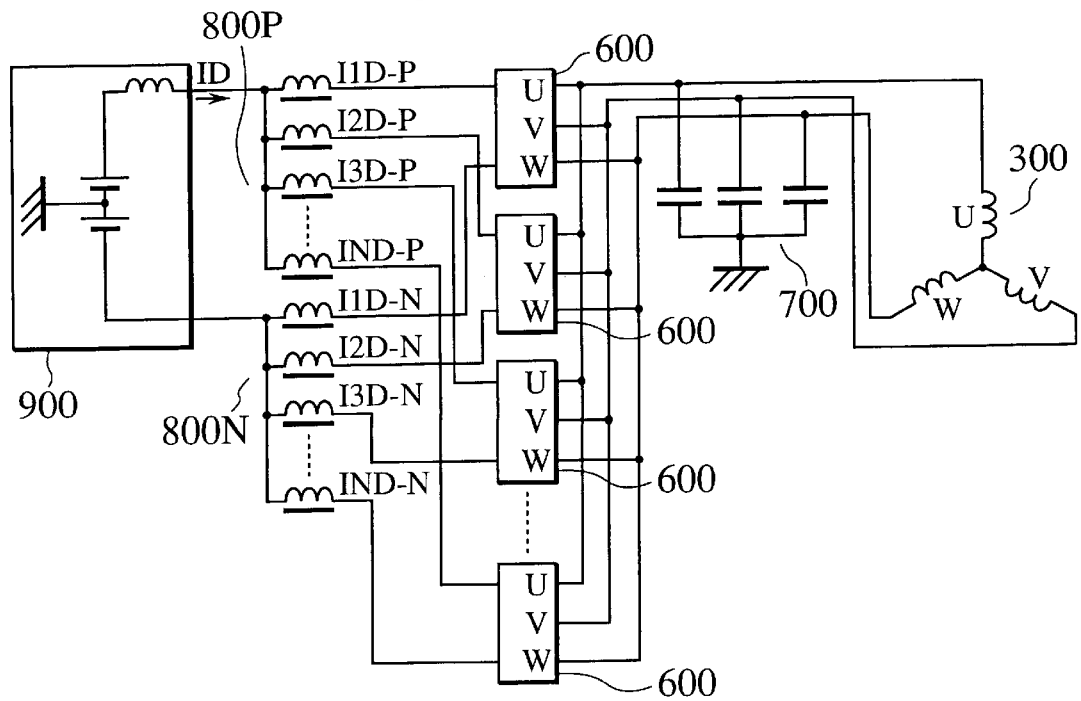
FIG. 5 is a block diagram showing a power converting system having current-type inverters that are parallel-multiplexed according to a prior art.
Figure 11:
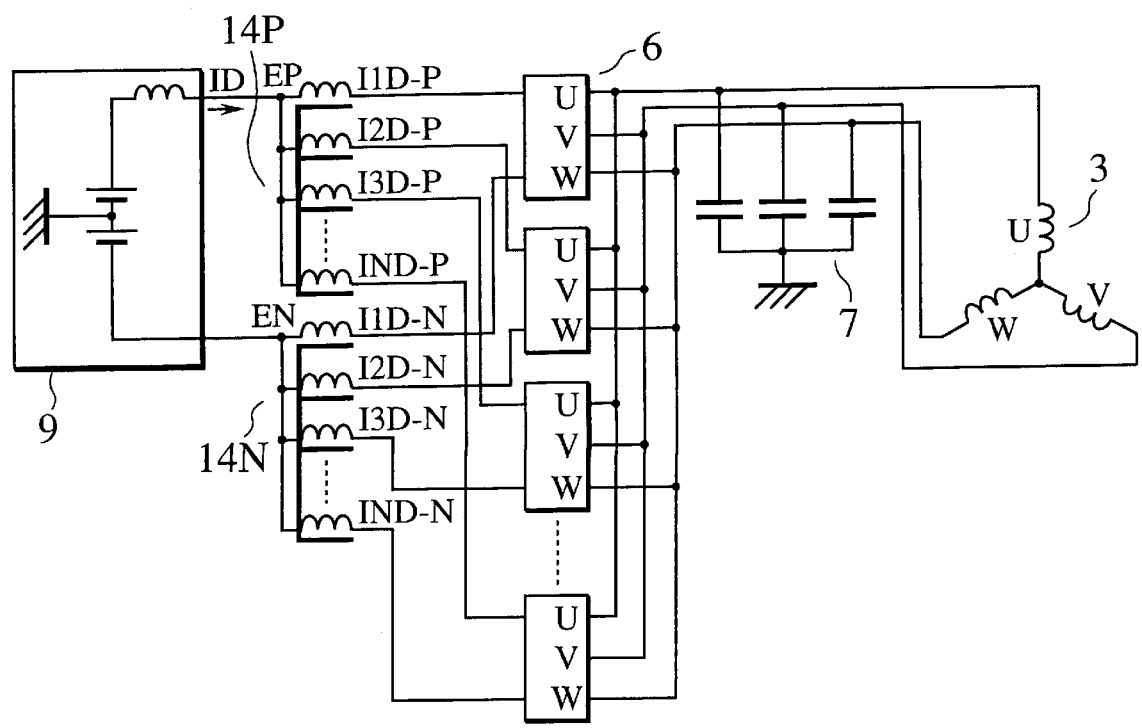
FIG. 11 is a block diagram showing a power converting system according to a third embodiment of the present invention.

A power converting system multiplexed with voltage dividing transformers according to the third embodiment of the present invention will be explained with reference to FIG. 11. Unlike the prior art of FIG. 5 that employs reactors for suppressing cross currents and parallel-multiplexed inverters, the third embodiment employs voltage dividing transformers 14P and 14N each having a multi-leg iron core, to parallel-multiplex inverters 6. The operation of the transformers 14P and 14N is the same as that of the first embodiment, and therefore, the details thereof will not be explained again. The transformers 14P and 14N involve DC terminal voltages E1D-P to END-P and E1D-N to END-N that have different momentary values. As a result, the transformers 14P and 14N provide impedance to suppress cross currents. A direct current ID from a DC power source is equally divided by N, and the divided currents are supplied to the windings of the transformers 14P and 14N. Consequently, the transformers 14P and 14N do not provide impedance with respect to the direct current.

Also, each inverter is 3-phase inverter, but this invention is applicable to M-phase inverter where M is an optional number.

Figure 12:
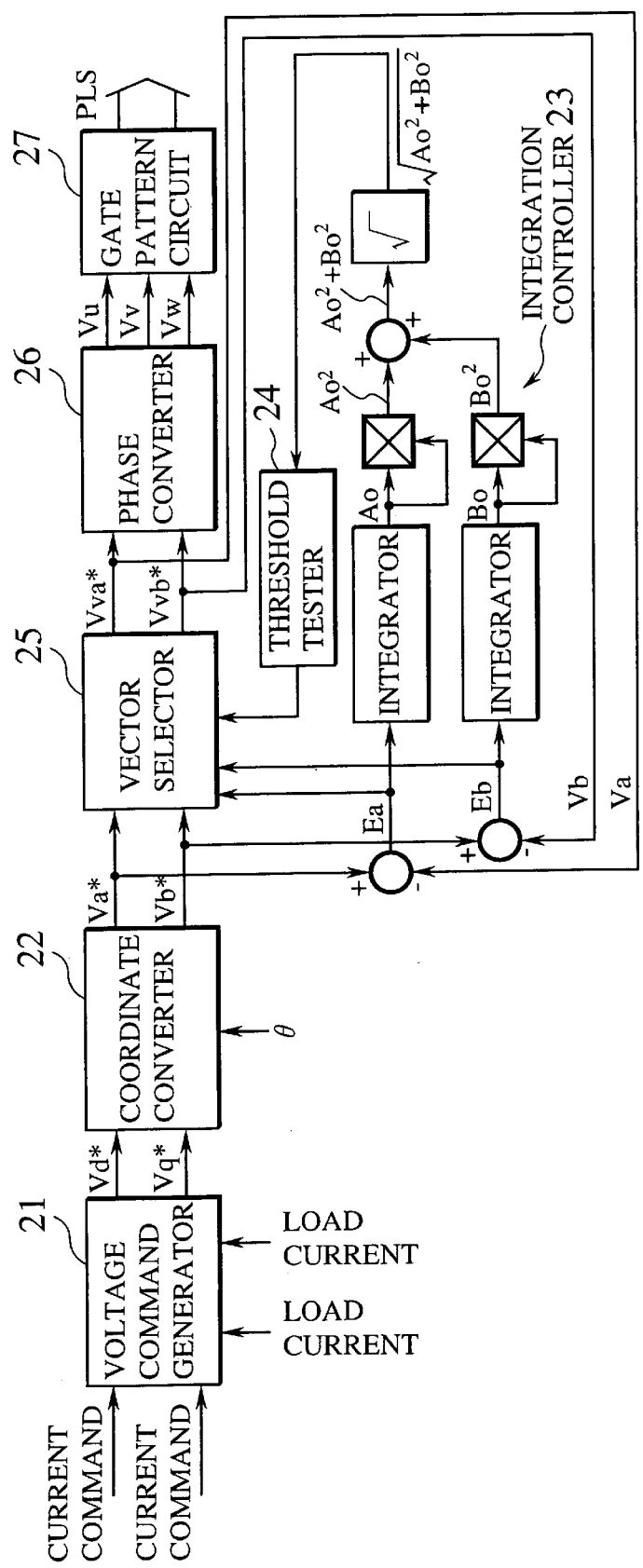
FIG. 12 is a block diagram showing a power converting system according to a fourth embodiment of the present invention.

A controller for a power converting system according to the fourth embodiment of the present invention will be explained with reference to FIG. 12. The controller controls a power converter such as an inverter of the power converting system. A voltage command generator 21 receives current commands and load currents, and issues voltage commands Vd* and Vq* for controlling actual currents. The voltage commands Vd* and Vq* that are on a rotating coordinate system that rotates in synchronization with a power source are converted by a coordinate converter 22 into voltage commands Va* and Vb* on a static coordinate system to calculate voltage command vectors. An integration controller 23 continuously integrates errors between the voltage commands Va* and Vb* and actual voltage command vectors Va and Vb. A threshold tester 24 determines the size of the integrated value. If the integrated value is above a threshold, a vector selector 25 selects an optimum switching state of the power converter and provides actual output voltage vectors Vva* and Vvb*. If the integrated value is below the threshold, the present switching state of the power converter is maintained.

A phase converter 26 converts the outputs of the vector selector 25 into 3-phase voltage commands. According to the 3-phase voltage commands, a gate pattern circuit 27 provides gate pulse signals for turning on and off self-turn-off switching elements of the power converter.

The operation of the controller of the fourth embodiment will be explained with reference to FIGS. 12 to 15. The voltage commands Vd* and Vq* provided by the voltage command generator 21 are on a rotating coordinate system. The coordinate converter 22 converts these commands into voltage command vectors Va* and Vb* as follows:

$$Va^* = Vd^* \times \cos\theta - Vq^* \times \sin\theta$$
$$Vb^* = Vd^* \times \sin\theta + Vq^* \times \cos\theta \qquad (1)$$

where an A-axis is in the direction of a U-phase, a B-axis is ahead of the A-axis by 90 degrees, and θ is the phase of a voltage to be output by the inverter, i.e., the power converter.

The integration controller 23 continuously integrates deviations or errors between the voltage command vectors Va* and Vb* and actual output voltage command vectors Va and Vb as follows:

$$Ao = \int (Ea)dt \quad Ea = Va^* - Va$$
$$Bo = \int (Eb)dt \quad Eb = Vb^* - Vb \quad (2)$$

The threshold tester 24 checks an integrated voltage error value Z that is expressed as follows:

$$Z = \sqrt{Ao^2 + Bo^2} \quad (3)$$

If the integrated error value Z is greater than a threshold, the threshold tester 24 sends an optimum vector selection command to the vector selector 25.

Figure 13:
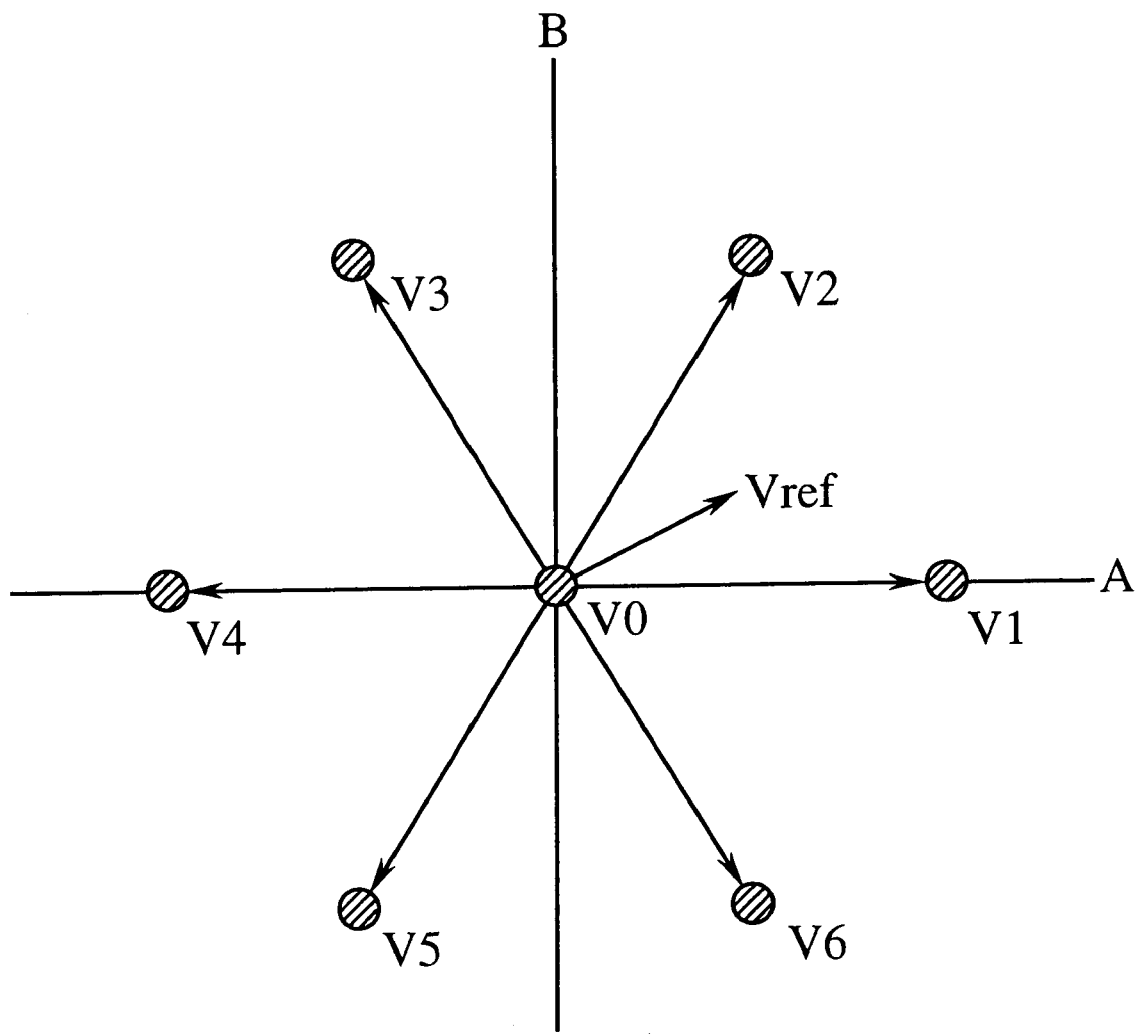
FIG. 13 shows voltage vectors to be generated by a power converter according to the present invention.
Figure 14:
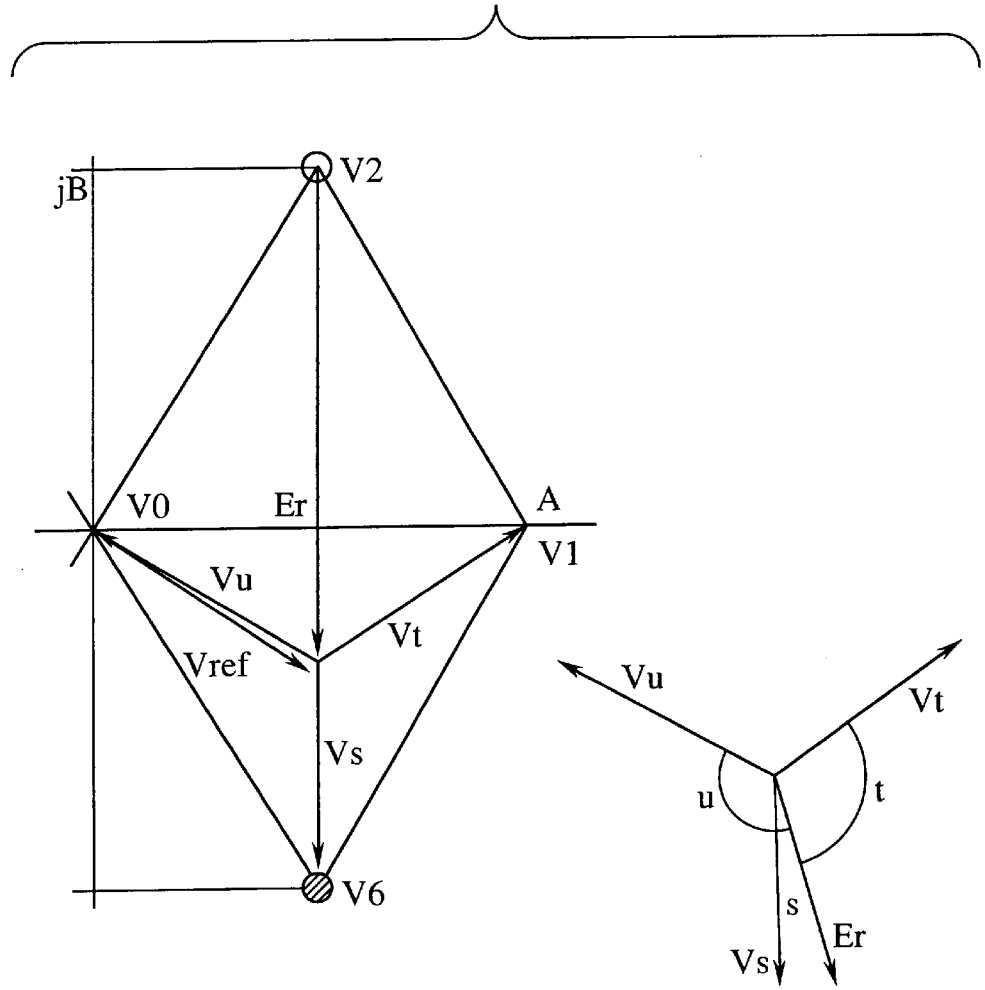
FIG. 14 shows a relationship between an error vector and differential vectors according to the present invention.
Figure 15:
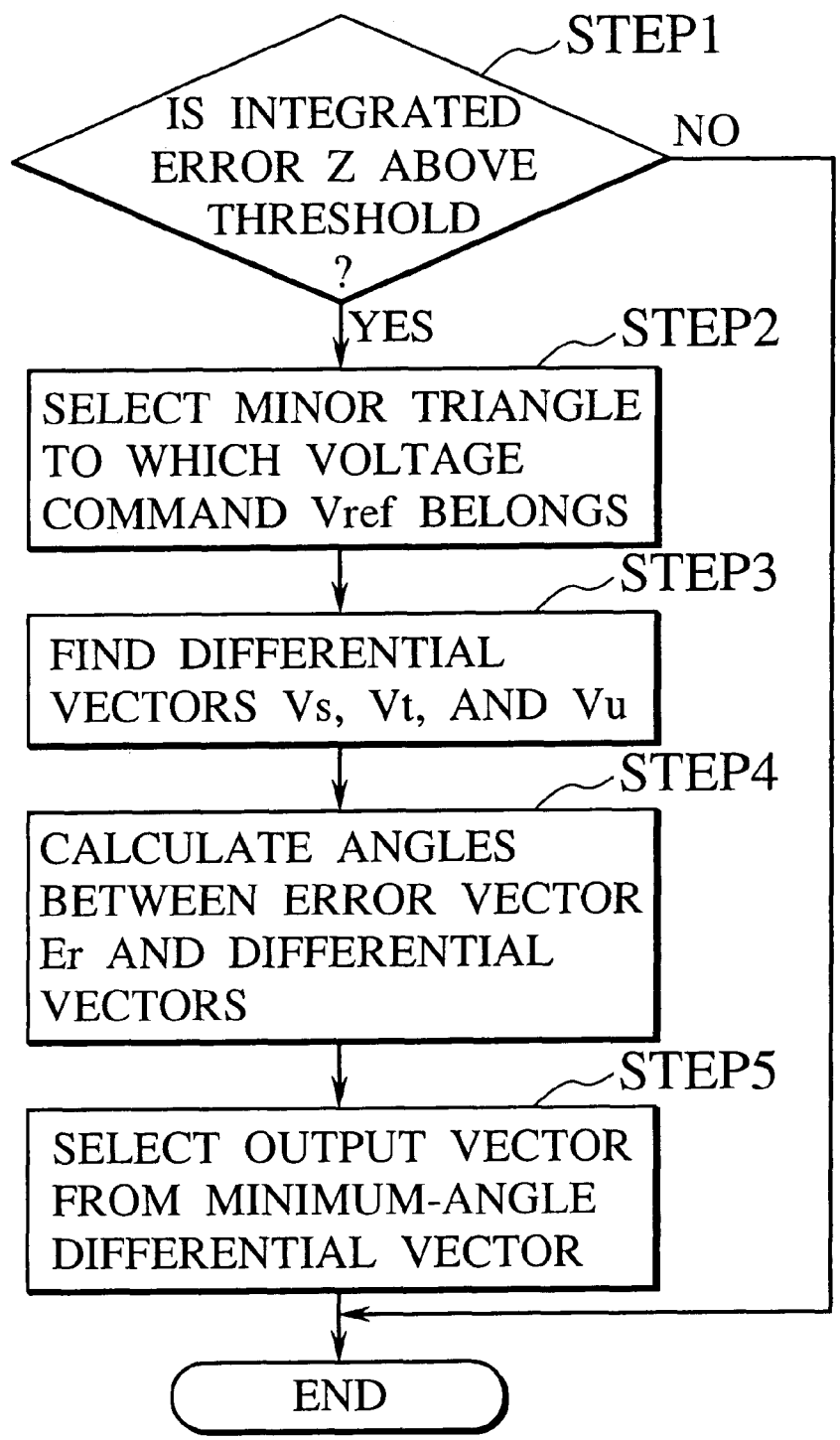
FIG. 15 is a flowchart showing a method of selecting an output voltage vector according to the present invention.

A method of selecting vectors carried out by the vector selector 25 will be explained. FIG. 13 shows voltage vectors to be generated by the inverter, FIG. 14 shows selecting an optimum vector, and FIG. 15 is a flowchart showing a sequence of selecting a vector. In FIG. 13, the inverter has seven possible voltage vectors expressed with V0 to V7.

Receiving the optimum vector selection command from the threshold tester 24, the vector selector 25 recognizes that the integrated error value Z is above the threshold in step 1 of FIG. 15. In step 2, the vector selector 25 selects a minor triangle to which a voltage command vector Vref (=Va*+ jVb*) among minor triangles defined by the seven possible output vectors.

In step 3, the vector selector 25 finds differential vectors Vs, Vt, and Vu that extend from an end point of the voltage command vector Vref to the vertexes of the selected minor triangle. In step 4, the vector selector 25 finds angles between the differential vectors Vs, Vt, and Vu and an error vector Er. In step 5, the vector selector 25 selects one of the differential vectors that forms a minimum angle with respect to the error vector Er and selects, as a vector "Va+jVb" to be output, the possible output vector that is at the vertex specified by the minimum-angle differential vector.

The phase converter 26 converts the outputs of the vector selector 25 into 3-phase voltage commands Vu, Vv, and Vw as follows:

$$Vu = \frac{2}{3} \times Va \quad (4)$$
$$Vv = \frac{2}{3} \times \left(-\frac{1}{2} \times Va + \frac{\sqrt{3}}{2} \times Vb\right)$$
$$Vw = -Vu - Vv$$

Based on the 3-phase voltage commands Vu, Vv, and Vw, the gate pattern circuit 27 generates gate pulse signals for turning on and off the self-turn-off switching elements of the inverter.

In this way, the controller of the fourth embodiment integrates the difference between a voltage command and an actual voltage vector, and if the integrated value is above a threshold, changes the switching conditions of the inverter. If the difference is small, a period in which the integrated value reaches the threshold becomes longer to decrease a switching frequency. This results in minimizing switching operations, thereby reducing a switching loss and improving the efficiency of the power converting system.

Depending on the integrated value, a command to be output may specify a pulse width that is narrower than a minimum ON pulse width. In this case, the minimum pulse width may be output instead of the narrow pulse width. This, however, distorts an output voltage waveform. To solve this problem, an output voltage vector will not be changed until the minimum ON pulse width is secured, even if the integrated value is above the threshold, and the integration operation is continued. When the minimum ON pulse width is secured, the output voltage vector will be changed. This technique is capable of securing the minimum ON pulse width and preventing waveform distortion because a portion that exceeds the threshold extends the next period to reach the threshold.

In this way, the controller of the fourth embodiment avoids the problem of the minimum ON pulse width of switching elements and achieves a voltage use ratio of 1 at the maximum.

A power converting system multiplexed with voltage dividing transformers according to the fifth embodiment of the present invention will be explained with reference to FIG. 16. The power converting system has a converter 34 for converting an alternating current 33 into a direct current, an inverter group consisting of inverters 35, 36, and 37 that are connected to the converter 34 in parallel, voltage dividing transformers 38, 39, and 40 for synthesizing output voltages of the inverters phase by phase, and a load 41 having U-, V-, and W-phases to receive the outputs of the transformers, respectively.

The transformer 38 has a 3-leg iron core with a winding being wound around each leg of the core. One ends of the windings are connected to U-phase AC terminals of the inverters 35 to 37 and the other ends thereof are joined together and connected to the U-phase of the load 41. Similarly, one ends of the windings of the transformers 39 and 40 are connected to V- and W-phases of the inverters, respectively, and the other ends thereof are connected to the V- and W-phases of the load 41, respectively. The load 41 is, for example, a variable-speed, 3-phase motor.

Figure 17:
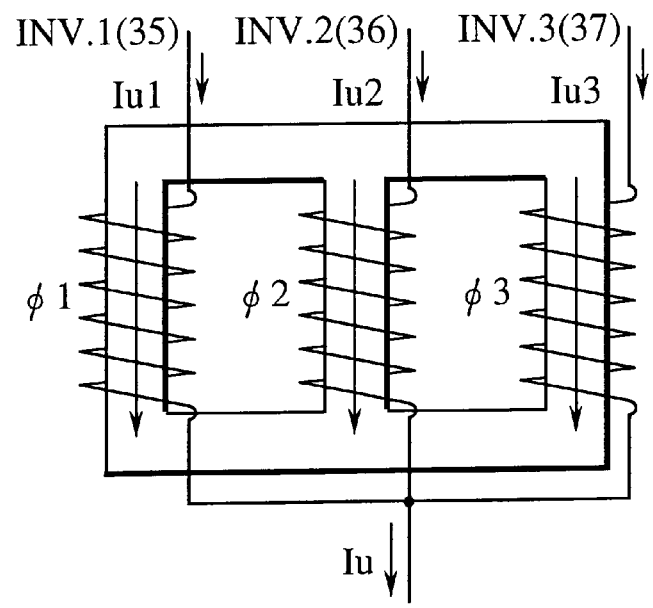
FIG. 17 shows a load current in a voltage dividing transformer of the system of FIG. 16.
Figure 18:
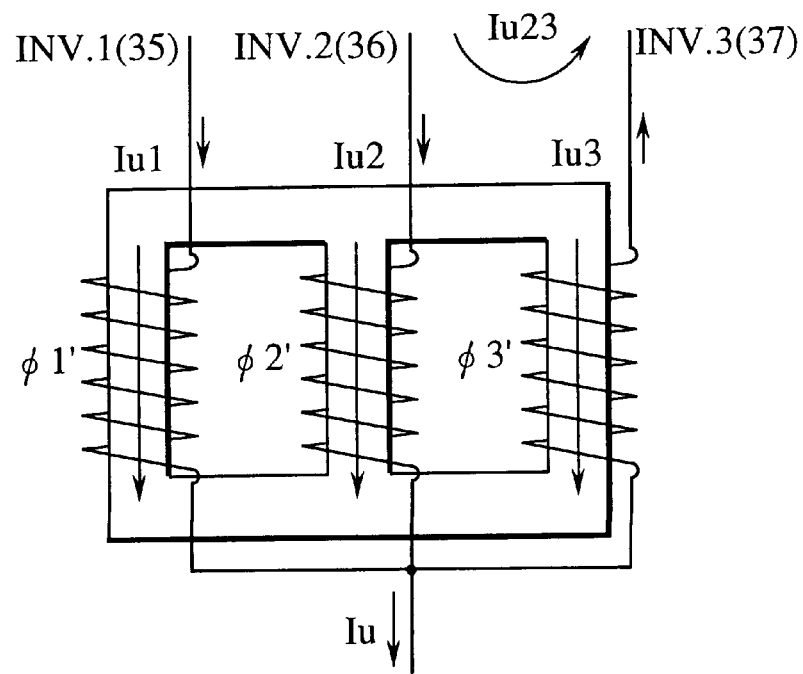
FIG. 18 shows a cross current in a voltage dividing transformer of the system of FIG. 16.

The operation of one of the voltage dividing transformers 38 to 40 will be explained with reference to FIGS. 17 and 18. Although the explanation is made in connection with the U-phase transformer 38, the same is applicable to the V- and W-phase transformers 39 and 40. FIG. 17 shows magnetic fluxes $\phi 1$, $\phi 2$, and $\phi 3$ produced by the transformer and currents Iu1, Iu2, and Iu3 flowing through the windings of the transformer. Generally, the output currents Iu1 to Iu3 of the three inverters are in the same phase and have the same magnitude, and therefore, the magnetic fluxes $\phi 1$ to $\phi 3$ produced in the legs of the iron core of the transformer cancel one another. Accordingly, inductance of the transformer with respect to the inverters is zero, so that the transformer provides no inductance with respect to a load current Iu, and theoretically, there is no voltage drop due to the load current Iu passing through the windings of the transformer.

Voltages INV.1(35), INV.2(36), and INV.3(37) generated by the inverters have an identical fundamental wave and different momentary voltage waveforms to produce currents such as a cross current Iu23 passing through the inverters. FIG. 18 shows magnetic fluxes $\phi 1'$, $\phi 2'$, and $\phi 3'$ generated by the transformer and currents Iu1, Iu2, Iu3, and Iu23 in the windings of the transformer. Unlike the case of FIG. 17, the magnetic fluxes $\phi 1'$ to $\phi 3'$ do not cancel one another, thereby producing magnetic fluxes in the transformer to increase inductance that suppresses the cross current Iu23.

The conventional power converting system multiplexed with AC reactors causes a voltage drop in each AC reactor due to a load current, and therefore, is unable to increase the inductance of each AC reactor. This increases cross currents circulating through inverters. On the other hand, the power converting system multiplexed with voltage dividing transformers according to the present invention theoretically causes no voltage drop with respect to a load current and produces inductance whose magnitude is proper for suppressing cross currents. As a result, the power converting system of the present invention is capable of multiplexing inverter outputs while suppressing cross currents.

To parallel-multiplex N inverters, the core of each voltage dividing transformer of the power converting system of the present invention is provided with N legs.

A controller for a power converting system multiplexed with voltage dividing transformers according to the sixth embodiment of the present invention will be explained. The power converting system may be the one shown in FIG. 16 and the controller controls power converters such as the inverters 35 to 37 of FIG. 16. The controller of the sixth embodiment is basically the same as that of the fourth embodiment of FIG. 12. Due to multiplexing, the number of voltage vectors provided by multiplexed inverters of the sixth embodiment is larger than that of the fourth embodiment. A vector selector 25 (FIG. 12) of the sixth embodiment is designed to cope with multiplexing.

Figure 19:
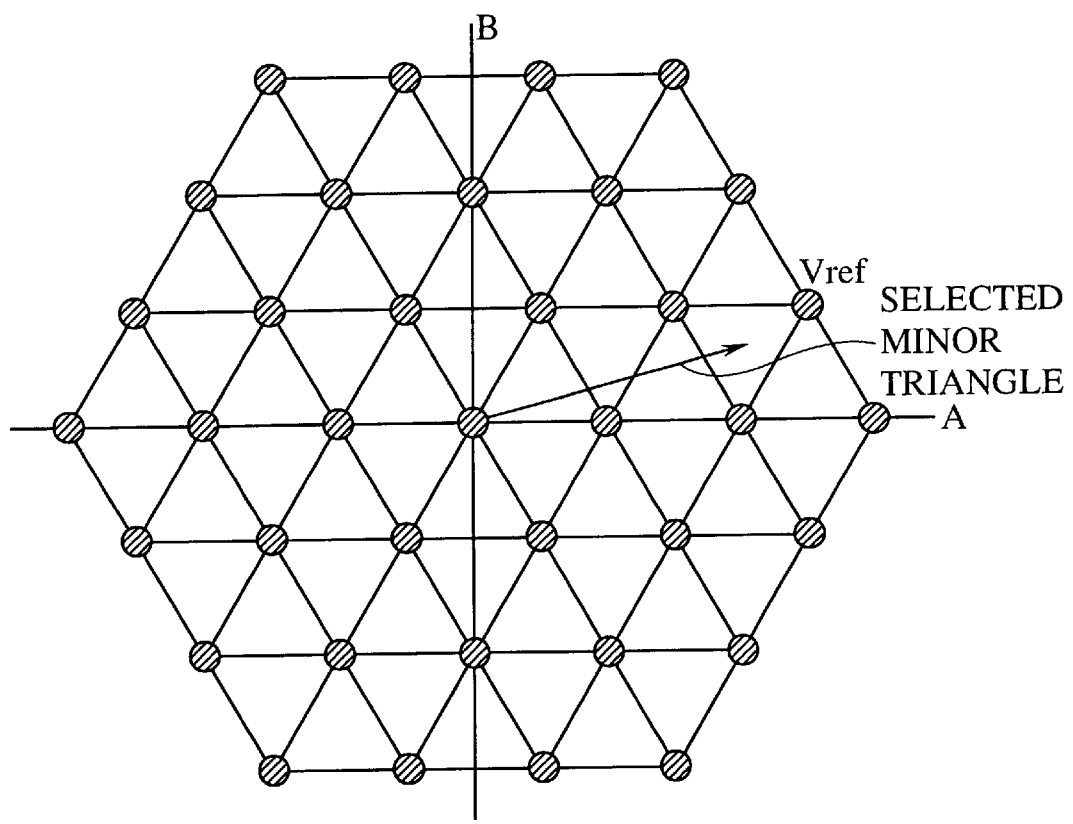
FIG. 19 shows voltage vectors to be generated by a power converting system having three power converters to which a controller of a sixth embodiment of the present invention is applied.

FIG. 19 shows voltage vectors to be output from three multiplexed inverters. The vertexes of minor triangles correspond to the voltage vectors. Compared with a single inverter, the number of output vectors of the three multiplexed inverters is increased to 37.

The operation of the vector selector 25 of the sixth embodiment will be explained with reference to FIGS. 12 and 15. If a threshold tester 24 determines that an integrated error is above a threshold, the vector selector 25 selects output vectors according to the flowchart of FIG. 15. Namely, the threshold tester 24 provides an optimum vector selection instruction to the vector selector 25, and the vector selector 25 recognizes in step 1 that an integrated voltage error Z is above the threshold. In step 2, the vector selector 25 selects a minor triangle to which a voltage command vector Vref belongs from among minor triangles defined by the possible output vectors.

In step 3, the vector selector 25 finds differential vectors Vs, Vt, and Vu extending from an end point of the voltage command vector Vref to the vertexes of the selected minor triangle In step 4, the vector selector 25 calculates angles between the differential vectors and an error vector Er. In step 5, the vector selector 25 finds a minimum one of the calculated angles, finds the differential vector corresponding to the minimum angle, and finds a voltage command vector at the vertex specified by the minimum-angle differential vector as a vector to be output.

A phase converter 26 converts the output of the vector selector 25 into 3-phase command voltage values Vu, Vv, and Vw. According to these values, a gate pattern circuit 27 generates gate pulse signals for the respective phases of the inverters.

Similar to the fourth embodiment, the sixth embodiment is capable of achieving a voltage use ratio of 1 at the maximum and minimizing switching operations. As a result, the sixth embodiment realizes a power converting system that is capable of reducing a switching loss, improving efficiency, and reducing harmonics due to the effect of multiplexing.

Figure 20:
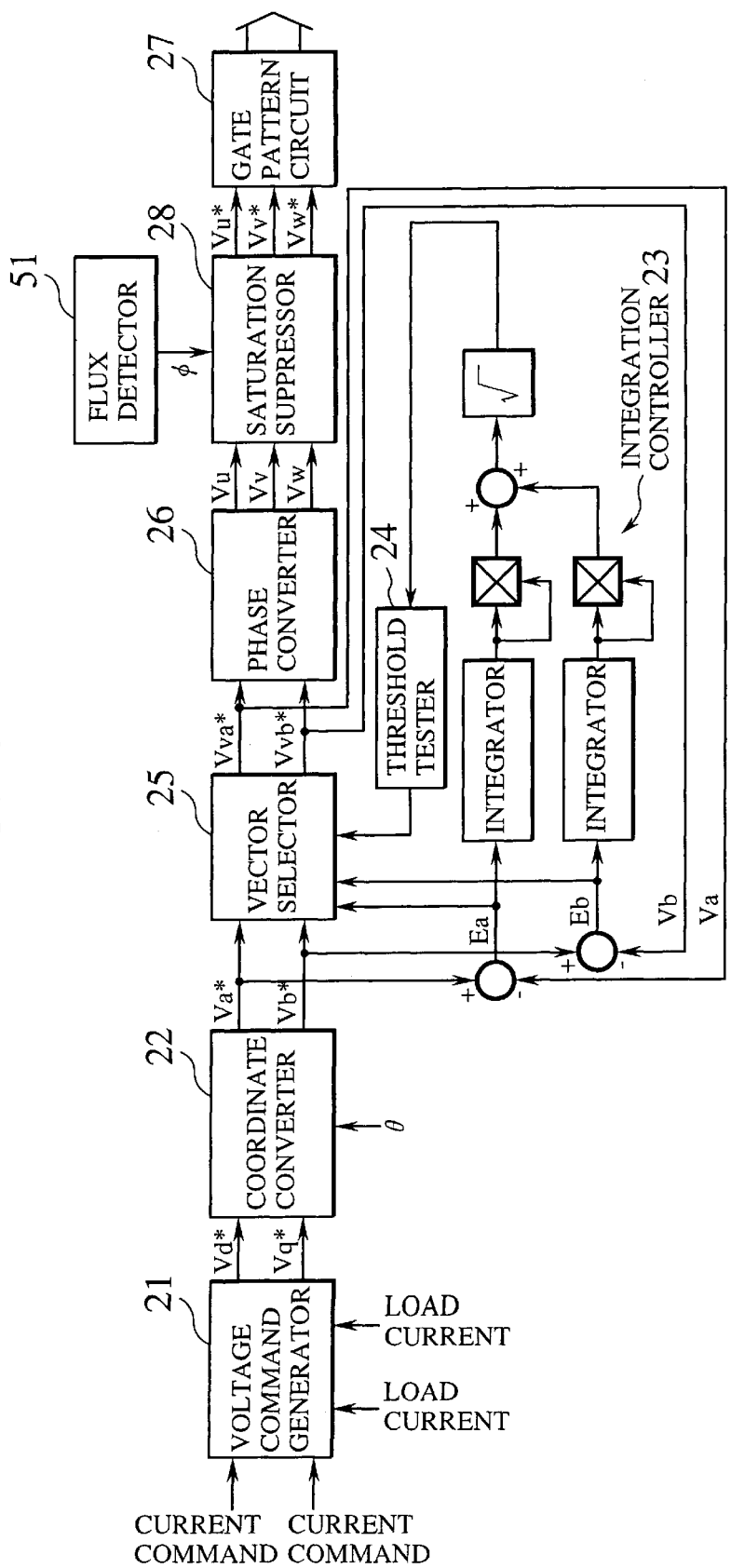
FIG. 20 is a block diagram showing a controller for a power converting system multiplexed with voltage dividing transformers according to a seventh embodiment of the present invention.

A controller for a power converting system multiplexed with voltage dividing transformers according to the seventh embodiment of the present invention will be explained with reference to FIG. 20. The power converting system may be the one shown in FIG. 16 and the controller controls power converters such as the inverters 35 to 37 of FIG. 16. In addition to the controller of the fourth embodiment of FIG. 12, the controller of the seventh embodiment has a flux detector 51 and a saturation suppressor 28. The flux detector 51 detects magnetic flux generated in each leg of each voltage dividing transformer. The saturation suppressor 28 is arranged for each phase to adjust output voltages distributed to the inverters 35, 36, and 37 (FIG. 16) so as to bring a line voltage as closer to a command value as possible and suppress magnetic flux saturation in each voltage dividing transformer.

Figure 21:
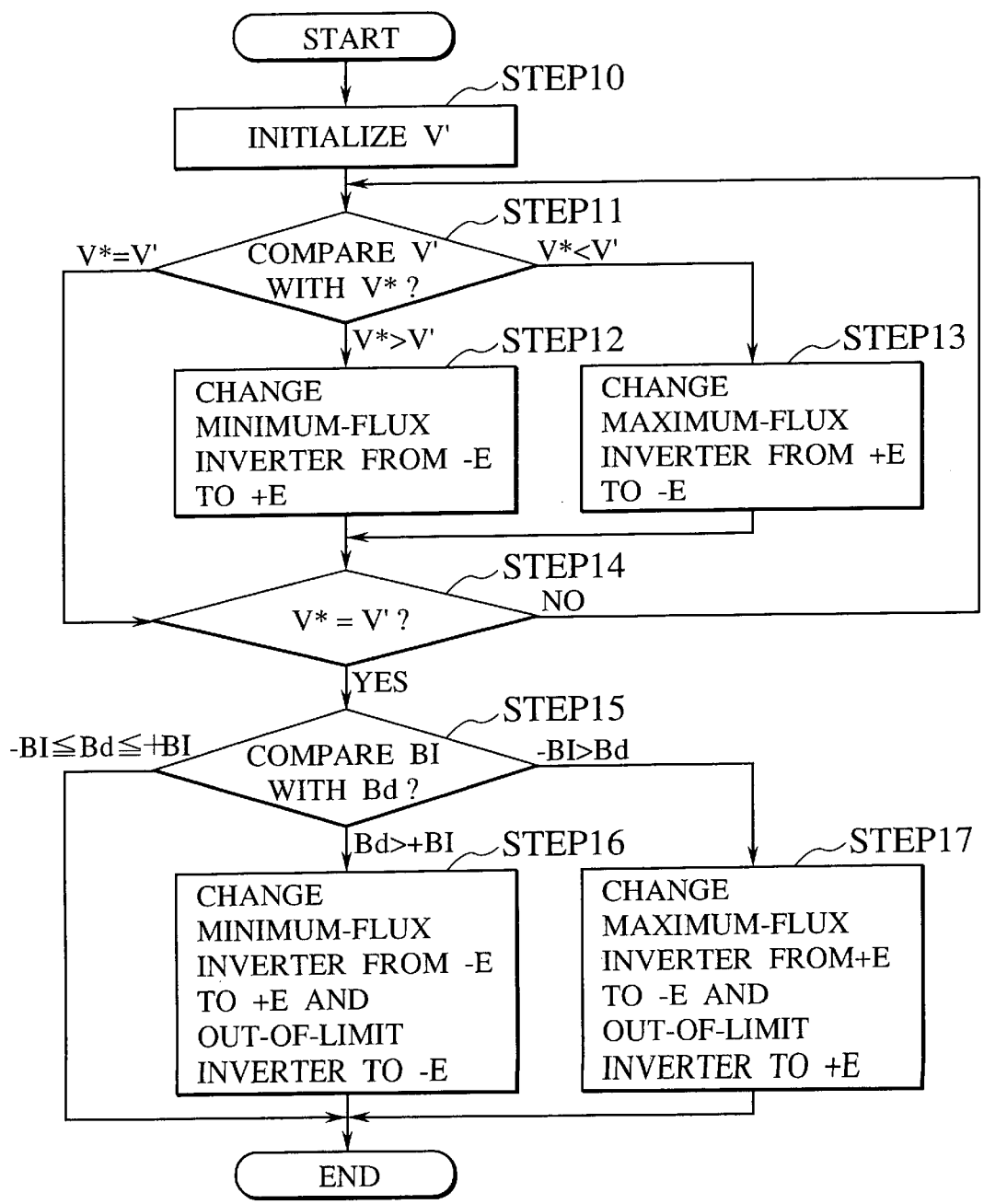
FIG. 21 is a flowchart showing a method of suppressing asymmetrical magnetization according to the present invention.
Figure 22:
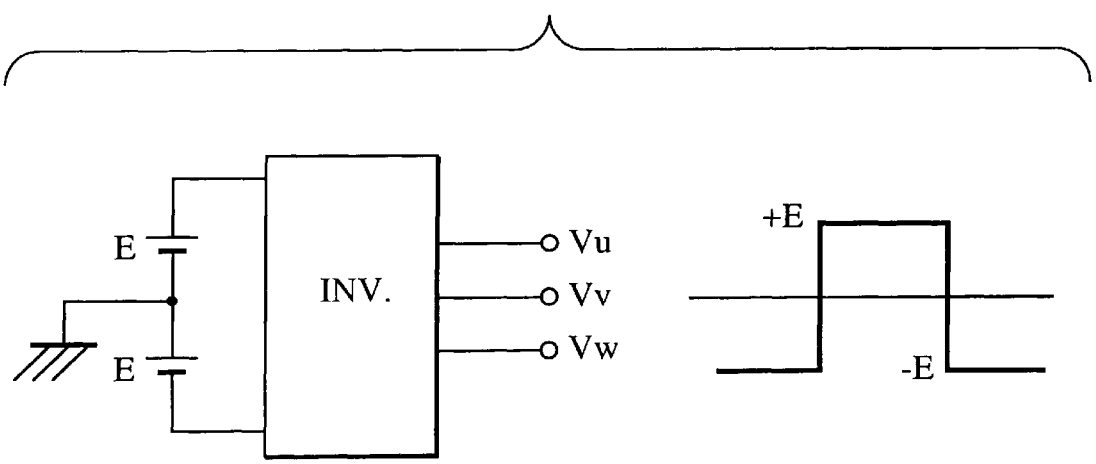
FIG. 22 is a model showing the amplitudes of an inverter.

The operation of the saturation suppressor 28 will be explained with reference to the flowchart of FIG. 21. An output voltage of an inverter is expressed like ±E as shown in FIG. 22. Step 10 initializes an output voltage index V' by converting a present output voltage into an integer. Step 11 checks to see if the index V' is equal to a command voltage V*.

If V*>V', step 12 selects an inverter whose magnetic flux is minimum among inverters that are outputting each −E and changes the output of the selected inverter to +E, thereby increasing the output voltage index. If V*<V', step 13 selects an inverter whose magnetic flux is maximum among inverters that are outputting each +E and changes the output of the selected inverter to −E, thereby decreasing the output voltage index. Step 14 repeats steps 11 to 13 until V' and V* become equal to each other.

Step 15 checks to see if a flux limit index BI is equal to a detected flux Bd. If Bd>+BI, step 16 finds an inverter whose magnetic flux is minimum and whose present output is −E, changes the output of the found inverter to +E, and changes the output of the inverter that provides Bd greater than +BI to −E. If Bd<−BI, step 17 finds an inverter whose magnetic flux is maximum and whose present output is +E, changes the output of the found inverter to −E, and changes the output of the inverter that provides Bd smaller than −BI to +E.

In this way, the seventh embodiment adjusts the outputs of the inverters to suppress magnetic flux saturation while minimizing an influence on the waveforms of output line voltages. Consequently, the seventh embodiment realizes a power converting system capable of achieving a voltage use ratio of 1 at the maximum, minimizing switching operations, improving efficiency at a reduced switching loss, reducing harmonics due to the effect of multiplexing, and suppressing asymmetrical magnetization of voltage dividing transformers.

Figure 23:
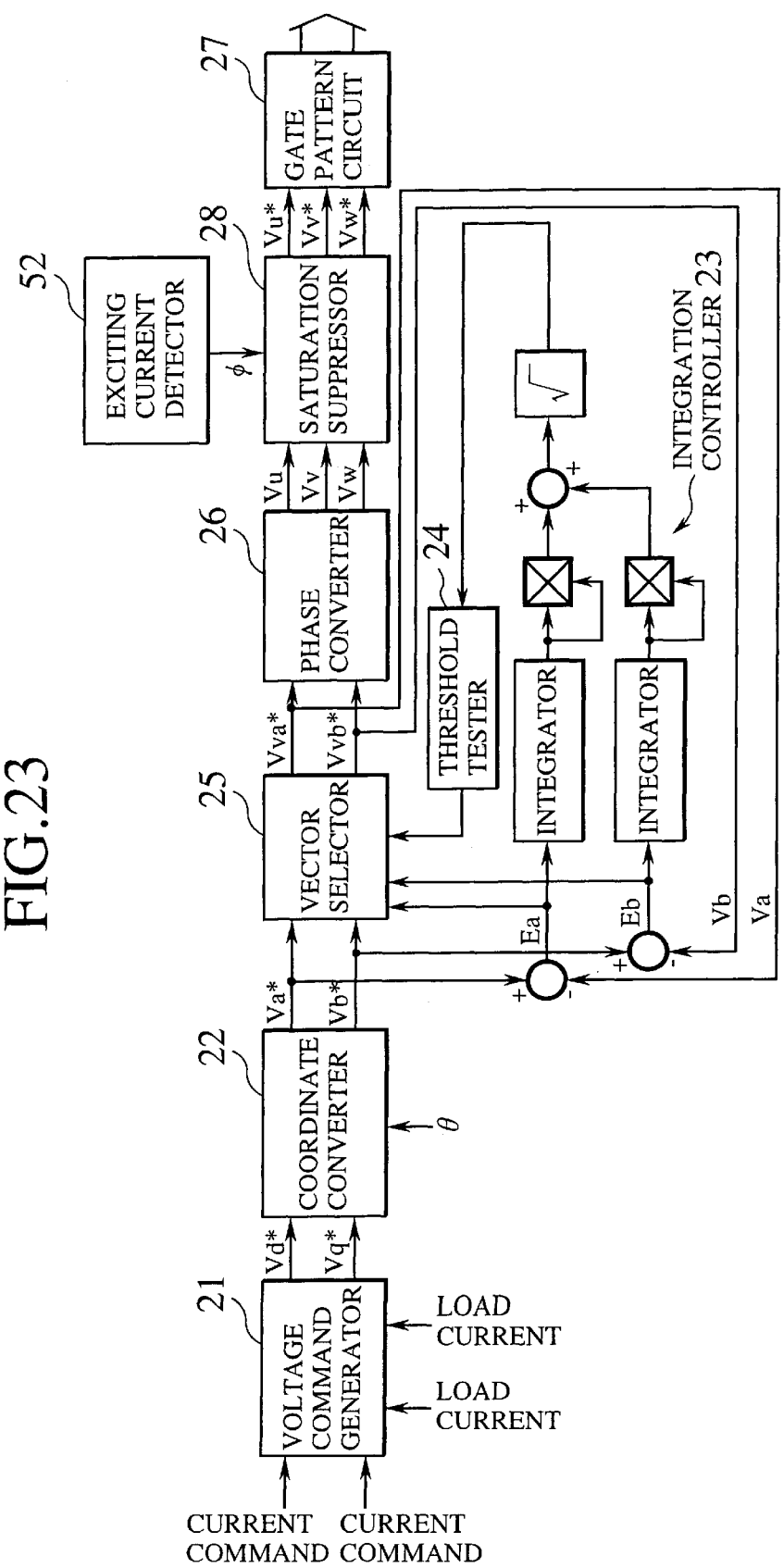
FIG. 23 is a block diagram showing a controller for a power converting system multiplexed with voltage dividing transformers according to a eighth embodiment of the present invention.

A controller for a power converting system multiplexed with voltage dividing transformers according to the eighth embodiment of the present invention will be explained with reference to FIG. 23. The power converting system may be the one shown in FIG. 16 and the controller controls power converters such as the inverters 35 to 37 of FIG. 16. Instead of the flux detector 51 of the seventh embodiment of FIG. 20, the eighth embodiment employs an exciting current detector 52 for detecting an exciting current generated by each winding wound around each leg of the voltage dividing transformers. Generally, magnetic flux is proportional to an exciting current, and therefore, detecting an exciting current is equivalent to detecting magnetic flux. When a winding wound around a first leg of a voltage dividing transformer passes a current It1 and a joined point provides a current It0, an exciting current Im of the winding is as follows:

$$Im = It1 - \frac{It0}{3} \tag{5}$$

This value is multiplied by a coefficient K obtained from the characteristics of an iron core of the transformer, to find a magnetic flux value φ as follows:

$$\phi = K \times Im \tag{6}$$

According to the magnetic flux, a saturation suppressor 28 suppresses magnetic flux saturation like the seventh embodiment. Consequently, the eighth embodiment realizes a power converting system capable of achieving a voltage use ratio of 1 at the maximum, minimizing switching operations, improving efficiency at a reduced switching loss, reducing harmonics due to the effect of multiplexing, and suppressing asymmetrical magnetization of voltage dividing transformers.

Figure 24:
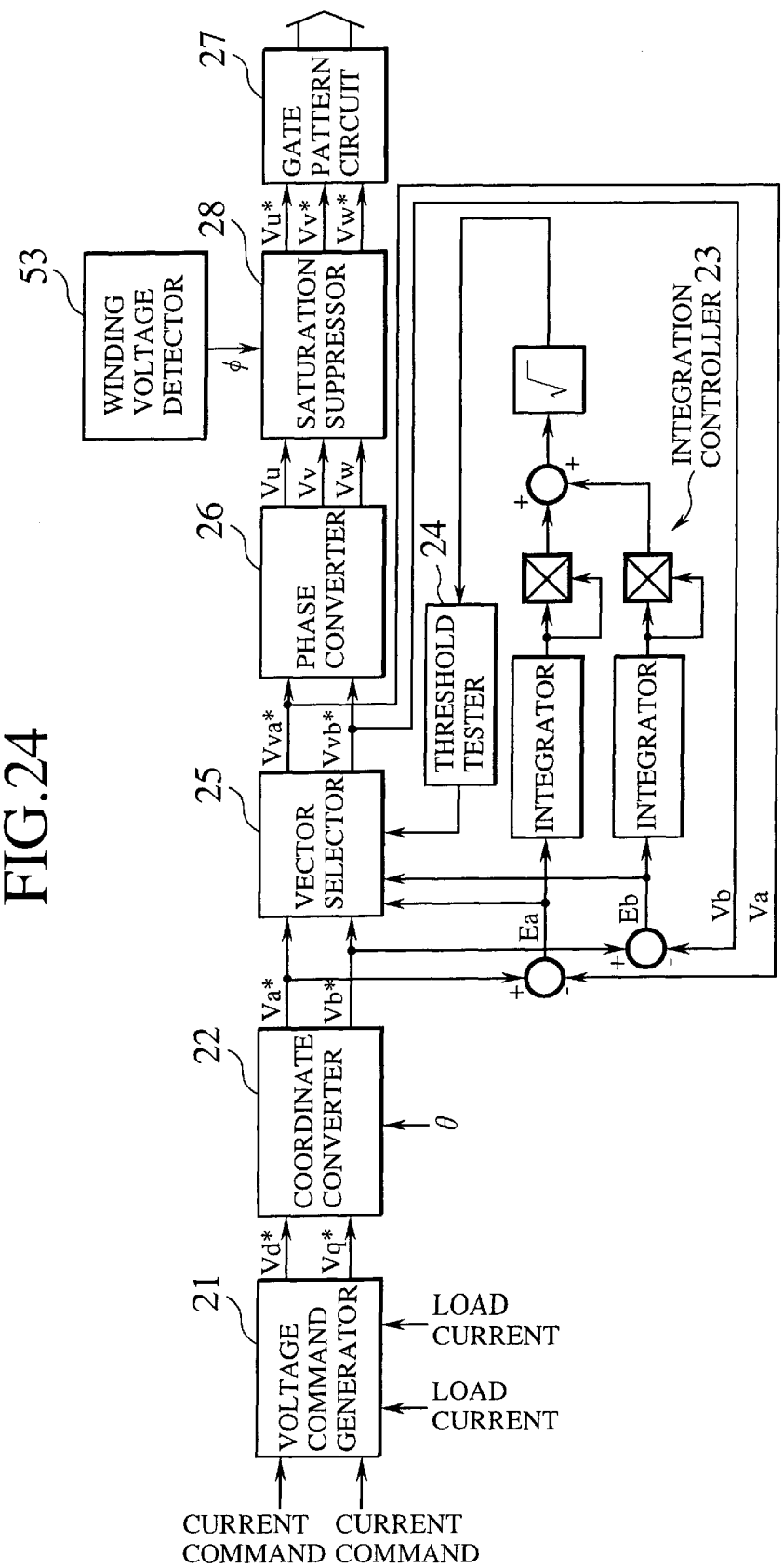
FIG. 24 is a block diagram showing a controller for a power converting system multiplexed with voltage dividing transformers according to an ninth embodiment of the present invention.

A controller for a power converting system multiplexed with voltage dividing transformers according to the ninth embodiment of the present invention will be explained with reference to FIG. 24. The power converting system may be the one shown in FIG. 16 and the controller controls power converters such as the inverters 35 to 37 of FIG. 16. Instead of the flux detector 51 of the seventh embodiment of FIG. 20, the ninth embodiment employs a winding voltage detector 53 for detecting a winding voltage of each voltage dividing transformer and estimating magnetic flux in the transformer as follows:

$$\phi = \int \epsilon \, dt \tag{7}$$

where ε is a voltage applied to a winding and φ is a magnetic flux value in the winding. According to the magnetic flux, flux saturation is suppressed like the seventh embodiment. Consequently, the ninth embodiment realizes a power converting system capable of achieving a voltage use ratio of 1 at the maximum, minimizing switching operations, improving efficiency at a reduced switching loss, reducing harmonics due to the effect of multiplexing, and suppressing asymmetrical magnetization of voltage dividing transformers.

Figure 25:
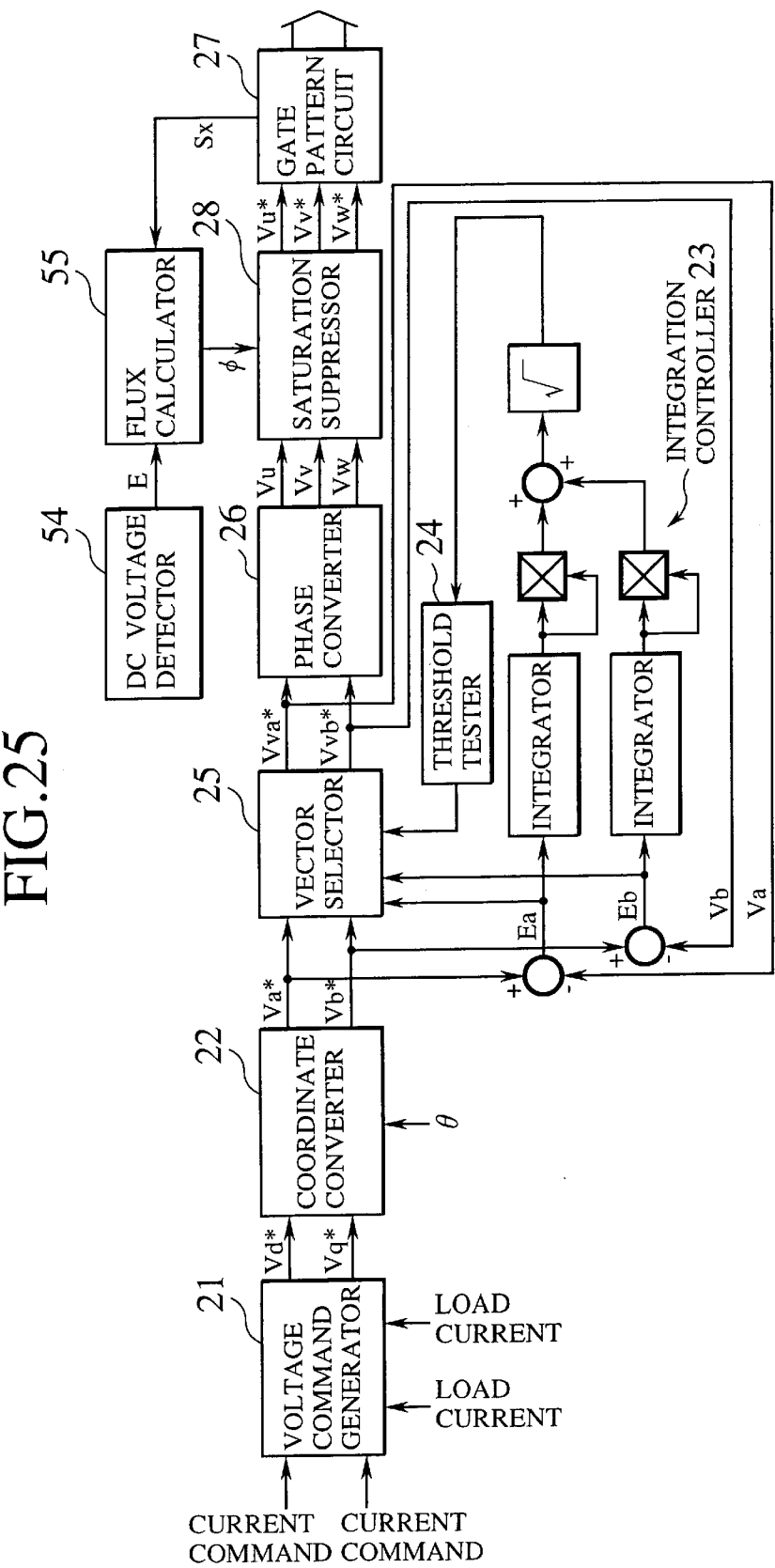
FIG. 25 is a block diagram showing a controller for a power converting system multiplexed with voltage dividing transformers according to a tenth embodiment of the present invention.

A controller for a power converting system multiplexed with voltage dividing transformers according to the tenth embodiment of the present invention will be explained with reference to FIG. 25. The power converting system may be the one shown in FIG. 16 and the controller controls power converters such as the inverters 35 to 37 of FIG. 16. Instead of the flux detector 51 of the seventh embodiment of FIG. 20, the tenth embodiment employs a DC voltage detector 54 and a flux calculator 55.

Figure 16:
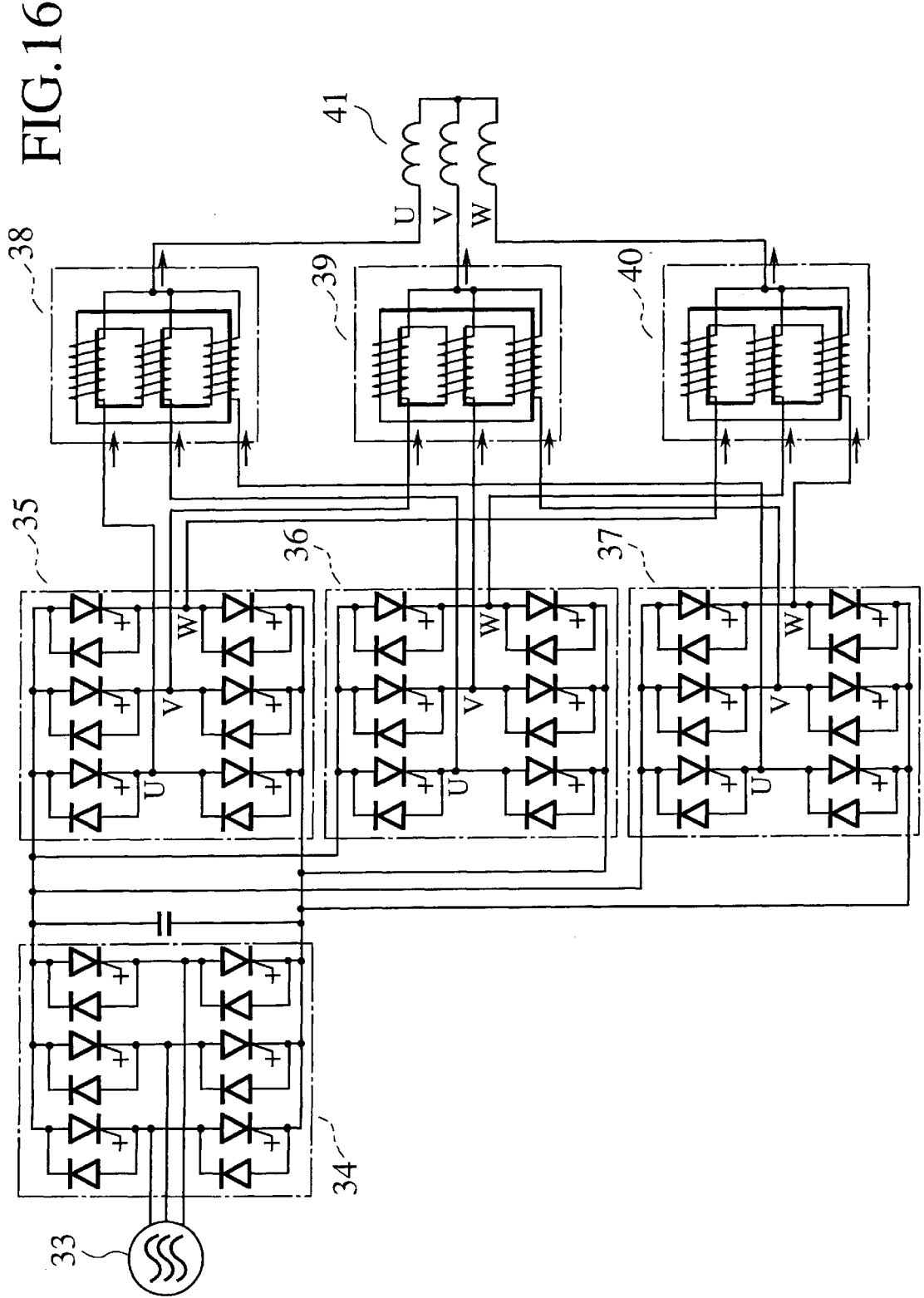
FIG. 16 is a block diagram showing a power converting system multiplexed with voltage dividing transformers according to a fifth embodiment of the present invention.

The DC voltage detector 54 detects an output DC voltage of the converter 34 (FIG. 16). The flux calculator 55 calculates a voltage to be applied to the voltage dividing transformers (38, 39, 40 of FIG. 16) from the switching states of the inverters (35, 36, 37 of FIG. 16), integrates such voltages, and calculates magnetic flux generated at each leg of the transformers.

The operation of the flux calculator 55 will be explained in connection with a U-phase. When the DC voltage detector 54 detects a voltage E, the switching conditions of the inverters are expressed as follows:

$$Su=1(Vu=+E), SU=0(Vu=-E)$$

$$Sx=0(Vu=+E), Sx=1(Vu=-E) \tag{8}$$

Accordingly, a U-phase AC voltage of the inverter 35 is expressed as follows:

$$EA1 = (Su-Sx) \times E \tag{9}$$

Similarly, EA2 of the inverter 36 and EA3 of the inverter 37 are obtained. Consequently, a joined point phase-voltage of the voltage dividing transformer is as follows:

$$EA_{AT} = (EA1+EA2+EA3)/3 \tag{10}$$

Then, a voltage applied by the inverter 35 to a leg of the voltage dividing transformer is as follows:

$$VLU1 = EA1 - EA_{AT} \tag{11}$$

Then, the magnetic flux of a leg of the voltage dividing transformer is as follows:

$$\phi = \int (VLU1) dt \tag{12}$$

Based on this magnetic flux, flux saturation is suppressed like the seventh embodiment. Consequently, the tenth embodiment realizes a power converting system capable of achieving a voltage use ratio of 1 at the maximum, minimizing switching operations, improving efficiency at a reduced switching loss, reducing harmonics due to the effect of multiplexing, and suppressing asymmetrical magnetization of voltage dividing transformers.

Figure 26:
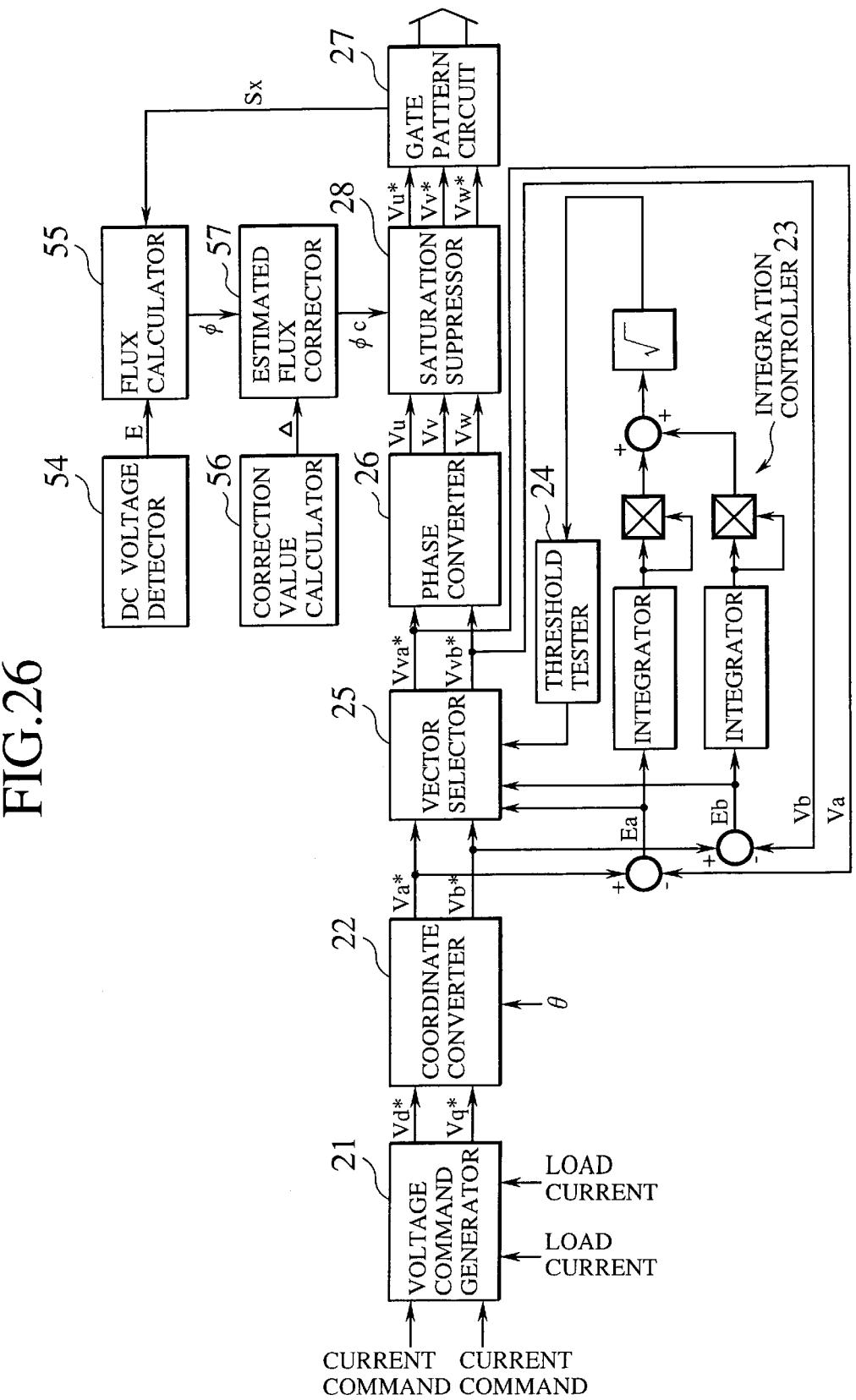
FIG. 26 is a block diagram showing a controller for a power converting system multiplexed with voltage dividing transformers according to a eleventh embodiment of the present invention.

A controller for a power converting system multiplexed with voltage dividing transformers according to the eleventh embodiment of the present invention will be explained with reference to FIG. 26. The power converting system may be the one shown in FIG. 16 and the controller controls power converters such as the inverters 35 to 37 of FIG. 16. In addition to the controller of the tenth embodiment of FIG. 25, the controller of the eleventh embodiment has a correction value calculator 56 and an estimated flux corrector 57.

The estimated flux corrector 57 adds a value provided by the correction value calculator 56 to an estimated flux value provided by a flux calculator 55, to correct an error between the estimated flux value and an actual flux value. The correction value calculator 56 employs an exciting current, a winding flux value, or a winding voltage to provide a DC component Δ directly or through a low-pass filter. The corrected flux φc is expressed as follows:

$$\phi c = \phi + G \cdot \Delta \tag{13}$$

where φ is an estimated flux provided by the flux calculator 55 and G is a gain. Based on the corrected flux φc, flux saturation is suppressed like the seventh embodiment. In this way, the eleventh embodiment corrects a calculated flux value according to, for example, an actual current, thereby minimizing an error in the calculation of magnetic flux.

Figure 27:
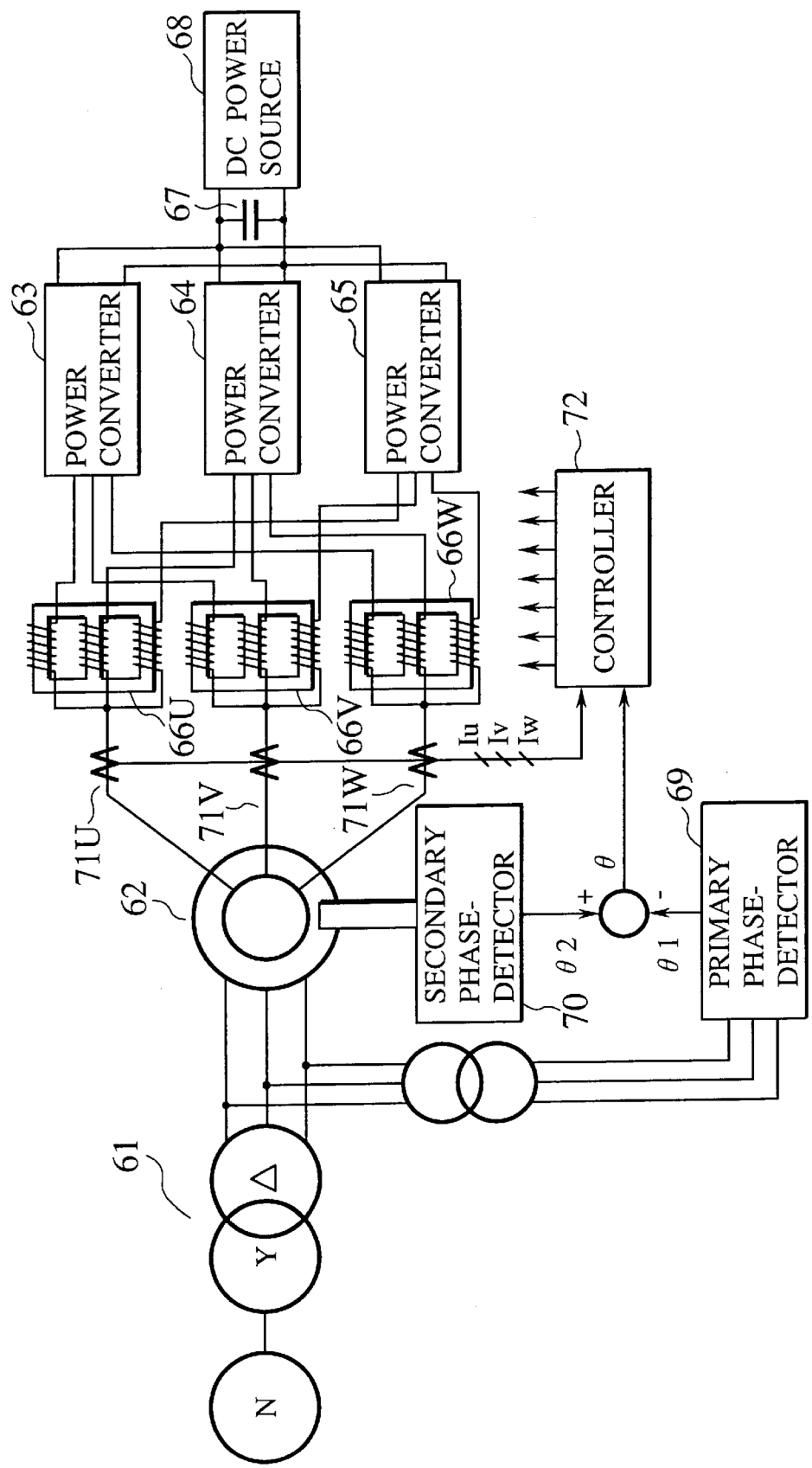
FIG. 27 is a block diagram showing a variable-pumped-storage power generating system according to the present invention.

FIG. 27 roughly shows a variable-speed, pumped-storage power generating system. A main transformer 61 is connected to a network on the one hand, and on the other hand, to a primary winding of a wound-rotor induction motor 62. A secondary winding of the motor 62 receives exciting currents from first to third power converters 63 to 65. The power converters 63 to 65 are parallel-multiplexed by voltage dividing transformers 66U, 66V, and 66W. A DC capacitor 67 is arranged on the DC side of the power converters 63 to 65. The DC capacitor 67 receives power from a DC power source 68. A first phase-detector 69 detects the phase of the primary side of the motor 62. A second phase-detector 70 detects the phase of the secondary side of the motor 62. Current detectors 71U, 71V, and 71W detect currents of the secondary side of the motor 62. A controller 72 controls the power converters 63 to 65 based on the outputs of the current detectors 71U, 71V, and 71W and the difference between the outputs of the phase-detectors 69 and 70.

Any one of the sixth to eleventh embodiments is applicable to control the power converters 63 to 65 to realize the effect of the present invention.

What is claimed is:

1. A power converting system comprising:
    a power converter group that includes a plurality of power converters that convert a direct current into an alternating current involving a plurality of phases;
    a DC power source arranged on the DC side of the power converter group; and
    voltage dividing transformers each having a multi-leg iron core and windings respectively wound around each leg of the multi-leg iron core, wherein one ends of the windings of each voltage dividing transformer are connected to AC terminals of an identical phase of the power converters and wherein the other ends of the windings of each voltage dividing transformer are joined together and connected to phases of a load, respectively.

2. A power converting system comprising:
    a power converter group that includes a plurality of power converters that convert a direct current into an alternating current;
    a first voltage dividing transformer having a multi-leg iron core and windings respectively wound around each leg of the multi-leg iron core, wherein first ends of the windings are joined together and wherein second ends of the windings are connected to first DC terminals of the power converters, respectively;
    a second voltage dividing transformer having a multi-leg iron core and windings respectively wound around each leg of the multi-leg iron core, wherein first ends of the windings are joined together and wherein second ends of the windings are connected to second DC terminals of the power converters, respectively; and
    a DC power source connected to the first and second voltage dividing transformers for supplying DC power to the DC side of the power converters through the first and second voltage dividing transformers,
    wherein AC terminals of the power converters are connected together phase by phase and are connected to a load phase by phase.

3. The power converting system of claim 1, wherein each of the power converters is any one of a 3-phase bridge inverter, a neutral-point-clamped 3-phase inverter, and a single-phase-configuration 3-phase bridge inverter.

4. A controller for a power converting system having a power converter provided with switching elements connected in a bridge configuration, the controller comprising:
    vector generating means for generating a voltage command vector for the power converter according to a current command and a detected load current;
    vector selecting means for defining an origin at start points of all possible voltage vectors to be provided by the power converter, setting a plane containing the origin and end points of the possible voltage vectors, finding, on the plane, an error vector between the voltage command vector and an actual voltage vector, temporally integrating absolute values of such error vectors into an integrated value, and if the integrated value exceeds a threshold, extending differential vectors from an end point of the error vector toward the possible voltage vectors that are in the vicinity of the voltage command vector, finding one of the differential vectors that forms a minimum angle with respect to the error vector, and selecting one of the possible voltage vectors that is specified by the minimum-angle differential vector as an actual output voltage vector; and
    gate pattern means for providing ON/OFF commands to the switching elements according to the actual output voltage vector.

5. A controller for a power converting system having a power converter group consisting of power converters for converting a direct current into an alternating current involving a plurality of phases, a DC power source arranged on the DC side of the power converter group, and voltage dividing transformers each having windings connected to AC terminals of an identical phase of the power converters, the other ends of the windings of each voltage dividing transformer being joined together and connected to phases of a load, respectively, the controller comprising:
    vector generating means for generating a voltage command vector for the power converting system according to a current command and a detected load current;
    vector selecting means for defining an origin at start points of all possible voltage vectors to be provided by the power converting system, setting a plane containing the origin and end points of the possible voltage vectors, finding, on the plane, an error vector between the voltage command vector and an actual voltage vector, temporally integrating absolute values of such error vectors into an integrated value, and if the integrated value exceeds a threshold, extending differential vectors from an end point of the error vector toward the possible voltage vectors that are in the vicinity of the voltage command vector, finding one of the differential vectors that forms a minimum angle with respect to the error vector, and selecting one of the possible voltage vectors that is specified by the minimum-angle differential vector as an actual output voltage vector; and
    gate pattern means for providing ON/OFF commands to the switching elements according to the actual output voltage vector.

6. The controller of claim 4, further comprising:
    flux detecting means for detecting magnetic flux generated by the voltage dividing transformers; and
    saturation suppressing means for checking to see if the detected magnetic flux is above a predetermined value according to the outputs of the vector selecting means and flux detecting means, and if it is above the predetermined value, controlling the outputs of the power converters to reduce magnetic flux generated by the voltage dividing transformers.

7. The controller of claim 4, further comprising:
    exciting current detecting means for detecting an exciting current for the voltage dividing transformers;
    flux estimating means for estimating magnetic flux generated by the voltage dividing transformers according to the detected exciting current; and
    saturation suppressing means for checking to see if the estimated magnetic flux is above a predetermined value according to the outputs of the vector selecting means and flux estimating means, and if it is above the predetermined value, controlling the outputs of the power converters to reduce magnetic flux generated by the voltage dividing transformers.

8. The controller of claim 4, further comprising:
    voltage detecting means for detecting a voltage applied to each winding of the voltage dividing transformers;
    flux estimating means for estimating magnetic flux generated by the voltage dividing transformers according to the detected voltages; and saturation suppressing means for checking to see if the estimated magnetic flux is above a predetermined value according to the outputs of the vector selecting means and flux estimating means, and if it is above the predetermined value, controlling the outputs of the power converters to reduce magnetic flux generated by the voltage dividing transformers.

9. The controller of claim 4, further comprising:

flux estimating means for estimating magnetic flux generated by the voltage dividing transformers according to a switching state of the power converters; and saturation suppressing means for checking to see if the estimated magnetic flux is above a predetermined value according to the outputs of the vector selecting means and flux estimating means, and if it is above the predetermined value, controlling the outputs of the power converters to reduce magnetic flux generated by the voltage dividing transformers.

10. The controller of claim 4, further comprising:

exciting current detecting means for detecting an exciting current for the voltage dividing transformers;

flux estimating means for estimating magnetic flux generated by the voltage dividing transformers according to the detected exciting current;

saturation suppressing means for checking to see if the estimated magnetic flux is above a predetermined value according to the outputs of the vector selecting means and flux estimating means, and if it is above the predetermined value, controlling the outputs of the power converters to reduce magnetic flux generated by the voltage dividing transformers; and correcting means for correcting an error between the estimated magnetic flux and actual magnetic flux according to the magnetic flux, exciting current, or winding voltage of the voltage dividing transformers.

11. The controller of claim 4, further comprising:

voltage detecting means for detecting a voltage applied to each winding of the voltage dividing transformers;

flux estimating means for estimating magnetic flux generated by the voltage dividing transformers according to the detected voltages;

saturation suppressing means for checking to see if the estimated magnetic flux is above a predetermined value according to the outputs of the vector selecting means and flux estimating means, and if it is above the predetermined value, controlling the outputs of the power converters to reduce magnetic flux generated by the voltage dividing transformers; and correcting means for correcting an error between the estimated magnetic flux and actual magnetic flux according to the magnetic flux, exciting current, or winding voltage of the voltage dividing transformers.

12. The controller of claim 4, further comprising:

flux estimating means for estimating magnetic flux generated by the voltage dividing transformers according to a switching state of the power converters;

saturation suppressing means for checking to see if the estimated magnetic flux is above a predetermined value according to the outputs of the vector selecting means and flux estimating means, and if it is above the predetermined value, controlling the outputs of the power converters to reduce magnetic flux generated by the voltage dividing transformers; and correcting means for correcting an error between the estimated magnetic flux and actual magnetic flux according to the magnetic flux, exciting current, or winding voltage of the voltage dividing transformers.

* * * * *